United States Patent
Duan

(10) Patent No.: US 11,453,233 B2
(45) Date of Patent: Sep. 27, 2022

(54) APPARATUS FOR PAGE-PRESSING AND BARRIER-FREE PAGE-TURNING

(71) Applicant: Cangsang Duan, Beijing (CN)

(72) Inventor: Cangsang Duan, Beijing (CN)

( * ) Notice: Subject to any disclaimer, the term of this patent is extended or adjusted under 35 U.S.C. 154(b) by 0 days.

(21) Appl. No.: 17/308,483

(22) Filed: May 5, 2021

(65) Prior Publication Data

US 2021/0252898 A1    Aug. 19, 2021

Related U.S. Application Data

(63) Continuation of application No. PCT/CN2019/105860, filed on Sep. 15, 2019.

(51) Int. Cl.
| | |
|---|---|
| *A47B 23/06* | (2006.01) |
| *B42D 9/00* | (2006.01) |
| *F16H 37/16* | (2006.01) |

(52) U.S. Cl.
CPC ............... *B42D 9/00* (2013.01); *A47B 23/06* (2013.01); *F16H 37/16* (2013.01)

(58) Field of Classification Search
None
See application file for complete search history.

(56) References Cited

U.S. PATENT DOCUMENTS

| | | | | |
|---|---|---|---|---|
| 5,149,046 | A * | 9/1992 | Kerley .................... | B42D 9/04 248/463 |
| 5,433,415 | A * | 7/1995 | Samson ................. | A47B 23/06 248/448 |
| 5,868,099 | A * | 2/1999 | Begin .................... | B42D 9/00 269/238 |
| 2005/0098702 | A1* | 5/2005 | Ibara ...................... | A47B 23/06 248/441.1 |
| 2005/0120601 | A1* | 6/2005 | Sadegh ................... | B42D 9/04 40/343 |
| 2007/0045503 | A1* | 3/2007 | Samari ................... | A47B 23/04 248/445 |

FOREIGN PATENT DOCUMENTS

| | | |
|---|---|---|
| CN | 2013104906326 | 1/2014 |
| CN | 103527738 A | 12/2015 |
| CN | 205326540 U | 6/2016 |
| CN | 107804087 A | 3/2018 |
| CN | 207579387 U | 7/2018 |
| CN | 109185414 A | 1/2019 |
| CN | 109281999 A | 1/2019 |
| CN | 110185764 A | 8/2019 |
| JP | 2011098882 A | 5/2011 |

OTHER PUBLICATIONS

ISR of PCT/CN2019/105860.

* cited by examiner

*Primary Examiner* — Steven M Marsh

(57) ABSTRACT

Disclosed is an apparatus for page-pressing and barrier-free page-turning. The apparatus includes page-pressing devices and a placement board. The page-pressing device is capable of switching between a first state and a second state. When the page-pressing device is in the first state, the page-pressing device is capable of tightly pressing against a book page(s) on the placement board. When the page-pressing device is in the second state, the page-pressing device is capable of releasing the press onto the book page(s). The page-pressing device is capable of mechanically self-locking to maintain a contact pressure to the book page(s) when the page-pressing device is in the first state to press against the book page(s), while the power causing the contact pressure no longer exists.

17 Claims, 16 Drawing Sheets

APPARATUS FOR PAGE-PRESSING AND BARRIER-FREE PAGE-TURNING

CROSS REFERENCE TO RELATED APPLICATIONS

This application is a continuation of PCT International Patent Application No. PCT/CN2019/105860, filed on Sep. 15, 2019, entitled "Apparatus for Page-pressing and Barrier-free Page-turning," which claims priority of PCT International Patent Application No. PCT/CN2018/115596, filed Nov. 15, 2018, the entire contents of which are hereby incorporated by reference in their entireties.

TECHNICAL FIELD

This disclosure relates to the field of transmission apparatus design and manufacturing, especially to a high mechanical-coupling page-pressing device which use a single motor to realize the functions of "releasing the mechanical locking when the pressing head is in pressure state, rising linearly, rotating forward, rotating reversely, falling linearly, pressing down and mechanically locking to maintain the pressing head in the pressure state," and another high mechanical-coupling page-pressing device to realize the functions of "releasing the mechanical locking when the pressing head is in pressure state, rotating upwards, rotating downwards, pressing down and mechanically locking to maintain the pressing head in pressure state."

BACKGROUND

With the development of science and technology, electronic books are more and more common. E-book has the advantages of convenient carrying, greater book storage, convenient page-turning, etc. However, the paper books also have a long-term need. Due to copyright issues, many books are only available in paper. People still prefer the paper books that need to be read carefully for a long time. E-books are displayed in small font within a small screen, so reader's eyes are easily tired when reading. Especially when musical instrument players are facing the music score, their eyes are dynamic relative to the music score and far away from the music score. In this case, the eyes are easier to get tired and paper music scores are more needed. Through the investigation, it is found that paper books are still the mainstream in school, musical instrument playing and other occasions as well as in classic reading or study. In general, paper book reading will remain as the basic way of reading for a long period of time in the future.

But the paper book reading sometimes needs to use the hand to stabilize the book, while the hand will get tired after long-time reading. In musical instrument play, the music score book is upright on the music stand, and the pages need to be held due to the loss of gravity. However, the existing various holding methods have caused difficulties in page-turning, which takes at least several motions of both hands to complete. Therefore, there is a need for apparatus, which have a page-holding function and are more convenient for turning pages, on the market.

Market survey results show that there is currently no such apparatus for the ordinary paper books available on the market. At the same time, it is found in the market survey that even if pages are manually flipped, as long as an apparatus can automatically complete mechanical actions of pressing the book pages, releasing the pressure, avoiding the flipped pages, to realize natural manual page-turning without any page-turning obstacles, the market demand can be obtained.

Considering that in the manual page-turning process, the pressing heads of the apparatus for page-pressing and barrier-free page-turning cannot interfere with the hand and pages, the technical requirements for the pressing heads in the technical solution are "releasing the mechanical lock when the pressing head is in pressure state, rising linearly, rotating 90° in the forward direction and stop (at this time, the hand and the flipped book pages cross the movement range of the pressing head of the page-pressing and barrier-free page-turning apparatus), rotating 90° in the reverse direction, falling linearly, pressing down and mechanically locking to maintain the pressing head in pressure state," or "releasing the mechanical locking when the pressing head is in pressure state, rotating upwards 90° (at this time, the hand and the flipped book pages cross the movement range of the pressing head of the page-pressing and barrier-free page-turning apparatus), rotating downwards, pressing down and mechanically locking to maintain the pressing head in pressure state." The mechanical response of the pressing head must be quick enough to follow the action of the page-turning hand in time.

As for the apparatus for "releasing the mechanical locking when the pressing head is in pressure state, rising linearly, rotating forward, rotating reversely, falling linearly, pressing down and mechanically locking to maintain the pressing head in the pressure state," the mechanism of claim 1 in inventor's patent application No. CN 201310490632.6, entitled "Mechanism Realizing Lifting and Rotating Actions," can meet the part of the functional requirements, that is "rising linearly, rotating forward, rotating reversely, falling linearly, pressing down."

In addition, through investigation, it is found that, in order to realize the actions of "rising linearly, rotating forward, rotating reversely, falling linearly, pressing down" and to realize position locking and maintaining the pressure to the pressed object after power off, the existing mechanical apparatus all use the solutions having guide rail+self-locking screw+turntable+motor, guide rail+non-self-locking screw+turntable+motor+brake, or non-screw linear transmission mechanism+turntable+brake. These solutions have such advantages: first, if a linear guide rail for guidance, a ball screw for transmission, and a motor with encoders are used, the positioning accuracy and the mechanical efficiency are great; second, due to the use of the guide rail for guidance and load, the load capacity is high; third, due to the use of an independent turntable for the rotation function, precision and load capacity are excellent.

Technical Problems

Since the existing mechanical apparatus need to realize the mechanical movement of two dimensions of lifting and rotating, the guide rails are basically used in the translational motions, and rotary tables are used in the rotational motions. These reduce the dynamic response capability of the apparatus and increase the size, complexity and cost of the apparatus and reduce the reliability of the apparatus.

If the existing apparatuses need to maintain the pressure to the pressed object under a power-off state, it will bring some additional problems.

If a non-self-locking screw is used for transmission, it has the following disadvantages: first, a brake device and its control function need to be added, and additional installation space is required; second, the processes of the mutual conversion between the brake state and the brake release state of the brake device require tens of milliseconds or longer, which cannot meet the higher time response requirement and increase the operating power consumption; third, it requires regular maintenance to ensure stability and reliability; fourth, the brake device increases complexity and cost of the apparatus.

If a self-locking screw is used for transmission, the thread raising angle should be less than or equal to the equivalent friction angle (when the thread raising angle of the screw and the nut is less than or equal to the equivalent friction angle, the nut has the screw axial self-locking performance on the screw). Since the thread raising angle is smaller, the screw transmission efficiency is low, which increases the requirement for power of the motor, resulting in increased apparatus size, operating power consumption, and cost.

Therefore, in applications requiring millisecond level time response, high transmission efficiency, applying pressure to the pressed object and self-locking without power, for example, the page-pressing and barrier-free page-turning apparatus, some new mechanical components need to be developed to meet these requirements.

SUMMARY OF THE DISCLOSURE

After the completion of the mechanism as described in claim 1 of the inventor's patent application No. CN 201310490632.6, entitled "Mechanism Realizing Lifting and Rotating Actions," in order to achieve faster translational motion time response and rotational motion time response under the same motor driving and to further improve reliability and mechanical efficiency of the mechanism, the inventor continued to develop two mechanisms realizing the lifting and rotating actions driven by single motor; one is the "full-track fusion body (base I+corresponding screw mechanism)," the other is "track+nut stop ring (base II+corresponding screw mechanism)."

Based on claim 1 of inventor's patent application No. CN 201310490632.6, entitled "Mechanism Realizing Lifting and Rotating Actions," the mechanism of "all-track fusion body (base I+corresponding screw mechanism)," and the mechanism of "track+nut stop ring (base II+corresponding screw mechanism)," the present invention added a pressing head connecting rod, a pressing head, and a motor, thus forming different mechanical apparatus. In the actual engineering design, if the length of the nut and the thread raising angle of the screw and the nut which is greater than the equivalent friction angle, the critical beam length of the pressing head connecting rod (the beam length of the pressing head connecting rod is defined as the distance from the center point of the pressure applied to the pressed object by the pressing head to the screw axis) which realizing screw axial self-locking of the pressing head could be achieved by gradually changing the beam length of the pressing head connecting rod. In the meantime, for the specific nut length and the beam length of the pressing head connecting rod, the thread raising angle of the screw and the nut is also the critical thread raising angle for the pressing head realizing the screw axial self-locking, i.e. the comprehensive self-locking angle. The comprehensive self-locking angle is always greater than the equivalent friction angle of the screw and the nut. When the pressing head applies pressure to the pressed object and the torque applied to the screw is stopped, if the thread raising angle of the screw and the nut is less than or equal to the comprehensive self-locking angle, the pressure of the pressing head to the pressed object is maintained; and if the thread raising angle of the screw and the nut is greater than the comprehensive self-locking angle, a brake device should be added to maintain the pressure of the pressing head to the pressed object. Accordingly, a class of page-pressing devices with single motor and achieving the mechanical function of "releasing the mechanical locking when the pressing head is in pressure state, rising linearly, rotating forward, rotating reversely, falling linearly, pressing down and mechanically locking to maintain the pressing head in the pressure state," are formed.

For the mechanical request of "releasing the mechanical locking when the pressing head is in pressure state, rotating upwards, rotating downwards, pressing down and mechanically locking to maintain the pressing head in pressure state," the inventor created the page-pressing device comprising a base, a worm, a worm gear, a worm gear shaft, a pressing head, a pressing head connecting rod and a motor.

Both the page-pressing devices, which having the mechanical function of "releasing the mechanical locking when the pressing head is in pressure state, rising linearly, rotating forward, rotating reversely, falling linearly, pressing down and mechanically locking to maintain the pressing head in the pressure state" or the mechanical function of "releasing the mechanical locking when the pressing head is in pressure state, rotating upwards, rotating downwards, pressing down and mechanically locking to maintain the pressing head in pressure state," may independently applied to the page-pressing and barrier-free page-turning apparatus. The independent features are reflected separately in the current claims. On basis of these page-pressing devices, the page-pressing and barrier-free page-turning apparatus may be formed to have a control device consisted of a detector (e.g. sensors or image recognizer, etc.), a driver, and a controller.

In one embodiment, the page-pressing device I of the present disclosure with the function of "releasing the mechanical locking when the pressing head is in pressure state, rising linearly, rotating forward, rotating reversely, falling linearly, pressing down and mechanically locking to maintain the pressing head in the pressure state" is consisted of a base I, a screw, a nut, a nut guide table, a pressing head, a pressing head connecting rod, a motor, a driving wheel, a transmission mechanism and a driven wheel. The motor is secured on the base I. The driving wheel is secured on the motor. The driven wheel is secured on the screw. The driving wheel is connected to the driven wheel through the transmission mechanism. If the thread raising angle of the screw and the nut is less than or equal to the comprehensive self-locking angle and a manual mode is required, a manual wheel needs to be secured coaxially to one end of the screw. If the thread raising angle of the screw and the nut is greater than the comprehensive self-locking angle, a brake device that is secured on the base I and is configured to brake the screw or the nut in braking state should be added. When the thread raising angle of the screw and the nut is less than or equal to the comprehensive self-locking angle, the pressing head is self-locked in the screw axial direction. There is a set of guide surfaces on the base I: a straight guide surface I, a straight guide surface II, a rotary guide surface I, and a rotary guide surface II. All the guide surfaces are generated from same or different parts secured to the base I, or all generated from the base I, or partially generated from same or different parts secured to the base I while the other generated from the base I. The straight guide surface I is parallel to the screw axis, or the straight guide surface I can be extended to contain the screw axis. The straight guide surface II is parallel to the screw axis, or the straight guide surface II can be extended to contain the screw axis. The nut guide table is on the nut as an independent component secured to the nut or as a nut-like characteristic generated from the nut itself. The base I, the guide surfaces, the screw, the nut and the nut guide table form motion relationships by three kinematic pairs: the first one is a rotation pair between the base I and the screw; the second one is a screw pair between the screw and the nut; the third one is a friction pair between the guide surfaces and the nut guide table. The screw is installed on the base I through the rotation pair; the screw and the nut are coordinatively installed through the screw pair; the nut guide table contacts the guide surfaces through the friction pair; the pressing head connecting rod is secured on the nut; the pressing head is an independent component secured on the pressing head connecting rod, or a part of the component processed integrally with the pressing head connecting rod.

When a forward torque is applied to the screw (the forward torque is greater than the torque required to release the pressing head which is in the screw axial self-locking state, or the brake has been released), the screw pushes the nut up along the straight guide surface I. When it rises to the topmost of the straight guide surface I, the nut guide table contacts the rotary guide surface I. The rotation force around the screw axis which the screw applies to the nut and the rotation force around the screw axis which the rotary guide surface I applies to the nut are in the same direction, and they form the rotation force of the nut. The screw axial force which the screw applies to the nut overcomes the screw axial force which the rotary guide surface I applies to the nut and forms the axial force of the nut. Under the combined effect of the rotation force and the axial force, the nut rotates forward and rises, along the rotary guide surface I, until the nut guide table reaches the upper end of the rotary guide surface II. When a reverse torque is applied to the screw, the principle of motion is the same as that of applying forward torque. The screw pushes the nut to rotate reversely and descend, along the rotary guide surface II. When it separates from the rotary guide surface II and contacts the straight guide surface II, it descends along the straight guide surface II until the pressing head contacts the pressed object and applies pressure to the pressed object. When the torque applied to the screw is stopped, if the thread raising angle of the screw and the nut is less than or equal to the comprehensive self-locking angle, the pressure of the pressing head to the pressed object is maintained. If the thread raising angle of the screw and the nut is greater than the comprehensive self-locking angle, a brake device could be used to maintain the pressure of the pressing head to the pressed object.

In another embodiment, the page-pressing device II of the present disclosure with the function of "releasing the mechanical locking when the pressing head is in pressure state, rising linearly, rotating forward, rotating reversely, falling linearly, pressing down and mechanically locking to maintain the pressing head in the pressure state" is consisted of a base II, a screw, a nut stop ring, a nut, a nut guide table, a pressing head, a pressing head connecting rod, a motor, a driving wheel, a transmission mechanism and a driven wheel. The motor is secured on the base II. The driving wheel is secured on the motor. The driven wheel is secured on the screw. The driving wheel is connected to the driven wheel through the transmission mechanism. If the thread raising angle of the screw and the nut is less than or equal to the comprehensive self-locking angle and a manual mode is required, a manual wheel needs to be secured coaxially to one end of the screw. If the thread raising angle of the screw and the nut is greater than the comprehensive self-locking angle, a brake device that is secured on the base II and is configured to brake the screw or the nut in the braking state should be added. When the thread raising angle of the screw and the nut is less than or equal to the comprehensive self-locking angle, the pressing head is self-locked in the screw axial direction. There is a set of guide surfaces on the base II: a straight guide surface I, a straight guide surface II, and a rotary guide surface II. All of the guide surfaces are generated from same or different parts secured to the base II, or all generated from the base II, or partially generated from same or different parts secured to the base II while the other generated from the base II. The straight guide surface I is parallel to the screw axis, or the straight guide surface I can be extended to contain the screw axis. The straight guide surface II is parallel to the screw axis, or the straight guide surface II can be extended to contain the screw axis. The nut guide table is on the nut as an independent component secured to the nut or as a nut-like characteristic generated from the nut. The base II, the guide surfaces, the screw, the nut and the nut guide table form motion relationships by three kinematic pairs: the first one is a rotation pair between the base II and the screw; the second one is a screw pair between the screw and the nut; the third one is a friction pair between the guide surfaces and the nut guide table. The screw is installed on the base II through the rotation pair. The screw and the nut are coordinatively installed through the screw pair. The nut guide table contacts the guide surfaces through the friction pair. The nut stop ring is secured on the screw. The pressing head connecting rod is secured on the nut. The pressing head is an independent component secured on the pressing head connecting rod or a part of the component processed integrally with the pressing head connecting rod.

When a forward torque is applied to the screw (the forward torque is greater than the torque required to release the pressing head which is in the screw axial self-locking state, or the brake has been released), the screw pushes the nut up along the straight guide surface I. When it rises to the topmost of the straight guide surface I, the restriction is released, and the nut rotates forward and rises at the same time. The length of the rotary guide surface II about the screw axial direction is determined according to the parameters such as the thread raising angle of the screw and the nut, the total mass and comprehensive rotational inertia of the nut and related components secured to the nut, etc, so that the rotation speed of the nut is increased by the rotary guide surface II during reverse rotation descent of the nut. Accordingly, when the nut rotates forward and there is no rotary guide surface to increase the rotation speed of the nut, the nut must first contact the nut stop ring and integrate with the screw before the nut guide table reaches the rotary guide surface II. Under the torque transmitted to the screw and the equivalent comprehensive rotational kinetic energy on the screw, the nut and the screw rotate together until the nut guide table reaches the upper end of the rotary guide surface II and then the nut and the screw stop together. When a reverse torque is applied to the screw, the rotation force around the screw axis which the screw applies to the nut and the rotation force around the screw axis which the rotary guide surface II applies to the nut are in the same direction, and they form the rotation force of the nut. The screw axial force which the screw applies to the nut overcomes the screw axial force which the rotary guide surface II applies to the nut, and forms the axial force of the nut. Under the combined effect of the rotation force and the axial force, the nut rotates reversely and descends, along the rotary guide surface II. When the nut guide table departs the rotary guide surface II and contacts the straight guide surface II, the nut descends along the straight guide surface II until the pressing head contacts the pressed object and applies pressure to the pressed object. When the torque applied to the screw is stopped, if the thread raising angle of the screw and the nut is less than or equal to the comprehensive self-locking angle, the pressure of the pressing head to the pressed object is maintained. If the thread raising angle of the screw and the nut is greater than the comprehensive self-locking angle, a brake device could be used to maintain the pressure of the pressing head to the pressed object.

In another embodiment, the page-pressing device III of the present disclosure with the function of "releasing the mechanical locking when the pressing head is in pressure state, rising linearly, rotating forward, rotating reversely, falling linearly, pressing down and mechanically locking to maintain the pressing head in the pressure state" is consisted of a base III, a screw, a nut stop ring, a nut slewing frame, a nut, a torsion spring, a spring plunger, a pressing head, a pressing head connecting rod, a motor, a driving wheel, a transmission mechanism and a driven wheel. The motor is secured on the base III. The driving wheel is secured on the motor. The driven wheel is secured on the screw. The driving wheel is connected to the driven wheel through the transmission mechanism. If the thread raising angle of the screw and the nut is less than or equal to the comprehensive self-locking angle and a manual mode is required, a manual wheel needs to be secured coaxially to one end of the screw. If the thread raising angle of the screw and the nut is greater than the comprehensive self-locking angle, a brake device that is secured on the base III and is configured to brake the screw or the nut in the braking state should be added. When the thread raising angle of the screw and the nut is less than or equal to the comprehensive self-locking angle, the pressing head is self-locked in the screw axial direction. The base III, the screw, the nut, the nut slewing frame form motion relationships by four kinematic pairs: the first one is a rotation pair between the base III and the screw; the second one is a screw pair between the screw and the nut; the third one is a sliding pair between the nut and the nut slewing frame; the fourth one is a rotation pair between the screw and the nut slewing frame. The screw is installed on the base III through the rotation pair. The screw and the nut are coordinatively installed through the screw pair. The nut stop ring is secured on the screw; the nut stewing frame is installed on the screw through the rotation pair. The nut stewing frame is also connected to the nut through the sliding pair. The torsion spring is installed coaxially and coordinatively with the screw with one end secured on the base III and the other end secured to the nut slewing frame. The spring plunger is secured on the base III. The pressing head connecting rod is secured on the nut. The pressing head is an independent component secured on the pressing head connecting rod or a part of the component processed integrally with the pressing head connecting rod.

When a torque is applied to the screw which is reverse to the torque of the torsion spring (the torque is greater than the torque required to release the pressing head which is in the screw axial self-locking state, or the brake has been released), the nut rises along the nut slewing frame which is in balanced position. When the nut contacts the nut stop ring, the nut and the screw become integrated, the driving torque applied to the screw overcomes the torque of the torsion spring to rotate forward the nut in place. After the driving torque applied to the screw is stopped, the nut is restricted by the spring plunger to overcome the torque of the torsion spring and maintain the position. When a reverse torque is applied to the screw, the nut descends a small distance along the axial direction of the screw and is separated from the rotation restriction of the spring plunger. Under the collective effect of torques of the screw and the torsion spring which are in the same direction, the nut slewing frame and the nut reversely rotate to balanced position. The nut descends along the nut slewing frame until the pressing head contacts the pressed object and applies pressure to the pressed object. When the torque applied to the screw is stopped, if the thread raising angle of the screw and the nut is less than or equal to the comprehensive self-locking angle, the pressure of the pressing head to the pressed object is maintained. If the thread raising angle of the screw and the nut is greater than the comprehensive self-locking angle, a brake device could be used to maintain the pressure of the pressing head to the pressed object.

In another embodiments, the page-pressing device IV with the function of "releasing the mechanical locking when the pressing head is in pressure state, rotating upwards, rotating downwards, pressing down and mechanically locking to maintain the pressing head in pressure state" is consisted of a base IV, a worm, a worm gear, a worm gear shaft, a pressing head, a pressing head connecting rod and a motor. The motor is secured on the base IV. The worm is driven by the motor. If a manual mode is required, a manual wheel needs to be secured coaxially on the non-powered end of the worm. The thread raising angle of the worm and the worm gear is less than or equal to the equivalent friction angle. The base IV, the worm, the worm gear, and the worm gear shaft form motion relationships by two kinematic pairs: the first one is a rotation pair between the base IV and the worm gear shaft; and the second one is a worm gear pair between the worm and the worm gear. The worm gear shaft is installed on the base IV through the rotation pair. The worm and the worm gear are installed coordinatively through the worm gear pair. The worm gear and the pressing head connecting rod are all secured to the worm gear shaft. The pressing head is an independent component secured on the pressing head connecting rod or a part of the component processed integrally with the pressing head connecting rod.

After applying a forward torque greater than the torque required to release the self-locking state of the worm gear and the worm, the worm drives the worm gear to rotate forward bringing the pressing head connecting rod and the pressing head to perform a rotational upward action. When a reverse torque is applied to the worm, the worm drives the worm gear to rotate in reverse bringing the pressing head connecting rod and the pressing head to rotate and drop until the pressing head contacts the pressed object and applies pressure to the pressed object. Because the thread raising angle of the worm and the worm gear is less than or equal to the equivalent friction angle, when the torque applied to the worm is stopped, the pressure of the pressing head to the pressed object is maintained.

BENEFICIAL EFFECT

Since the specific functions of the page-pressing devices applied to the apparatuses can be realized without using turntables and brake devices, the page-pressing devices and apparatuses are simplified. The process of the pressing heads of "releasing the pressure, avoiding, pressing down and maintaining the pressure" becomes more rapid. The dynamic response performance of the pressing heads is improved. Faults caused by turntables and brake devices can be eliminated, reliability of the apparatuses is improved; cost of apparatuses is reduced. The apparatuses are more portable. Based on the signals of sensors or image recognizers, the page-pressing devices of these apparatuses can realize the corresponding mechanical functions to avoid the flipped pages. In the absence of power, the pressing heads of the page-pressing devices can still tightly press book pages on the placement board where the book are placed.

Figure 1:
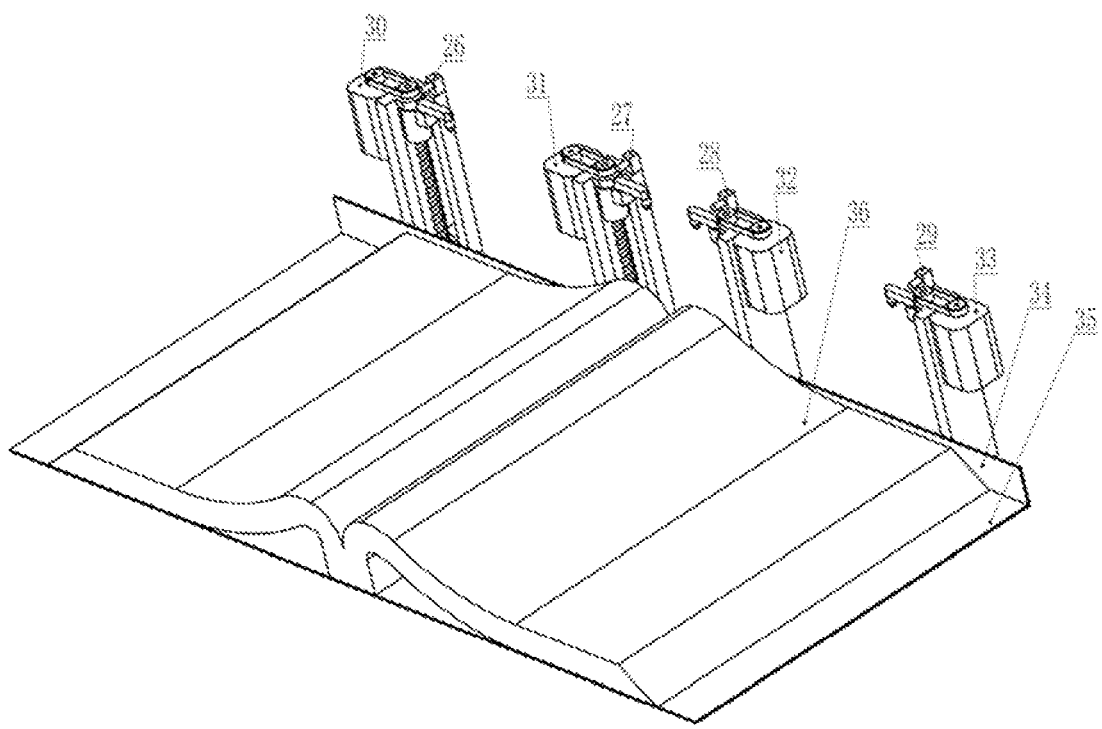
FIG. 1 is a schematic diagram of the apparatus for page-pressing and barrier-free page-turning according to one embodiment of the present disclosure. In which, all of the first page-pressing device, the second page-pressing device, the third page-pressing device and the fourth page-pressing device are in a second state which releases the pressing on the book page.

In the drawings:
1—base I; 2—base II; 3—base III; 4—base IV; 5—straight guide surface I; 6—straight guide surface II; 7—transition surface; 8—rotary guide surface I; 9—rotary guide surface II; 10—screw; 11—nut; 12—nut guide table; 13—nut stop ring; 14—nut slewing frame; 15—torsion spring; 16—spring plunger; 17—worm; 18—worm gear; 19—worm gear shaft; 20—pressing head connecting rod; 21—pressing head; 22—motor; 23—driving wheel; 24—transmission mechanism; 25—driven wheel; 26—first sensor; 27—second sensor; 28—third sensor; 29—fourth sensor; 30—first page-pressing device; 31—second page-pressing device; 32—third page-pressing device; 33—fourth page-pressing device 34—base plate; 35—back plate; 36—book; 1601—detector; 1602—controller; 1603—driver.

DETAILED DESCRIPTION OF THE DISCLOSURE

Firstly, it is necessary to explain some words, reference numerals, drawings, and terms used in the embodiments of the present disclosure.

In the description and claims of this application, "comprise," "include," "consist of" and the like should be interpreted as open-ended rather than exclude or exhaust meaning. Namely, these words/terms shall be interpreted as "include but not limited to."

The word "up" is an orientation that is upward in the axial direction, and the word "down" is an orientation that is downward in the axial direction.

In each figure of the present disclosure, the same elements are presented by same or similar reference numerals. For the sake of clarity, various parts in the figures are not drawn to scale.

The track slot I is located on the base I 1. The track slot I is consisted of a straight guide surface I 5, a straight guide surface II 6, a rotary guide surface I 8 and a rotary guide surface II 9. The straight guide surface I 5 and the rotary guide surface II 9, the straight guide surface II 6 and the rotary guide surface I 8 are all intersecting and transiting. The track slot II is located on the base II 2. The track slot II is consisted of straight guide surface I 5, a straight guide surface II 6, a transition surface 7 and a rotary guide surface II 9. The straight guide surface I 5 and the rotary guide surface II 9 are intersecting and transiting. The straight guide surface I 5 and the straight guide surface II 6 of the track slot I and the track slot II are respectively parallel to the screw 10 axis or respectively can be extended to contain the screw 10 axis. The nut guide table 12 is on the nut 11 as an independent component secured to the nut 11 or as a nut-like characteristic generated from the nut 11. The sliding or rolling friction pair can be used between the nut guide table 12 and the track slot I or track slot II.

The pressing head 21 is an independent component secured to the pressing head connecting rod 20.

The thread raising angle of the screw 10 and the nut 11 in embodiments 1-4 is less than or equal to the comprehensive self-locking angle and is greater than the equivalent friction angle.

In the manual mode, the working principle of the page-pressing devices applied to the present apparatus is exactly the same as that in semi-automatic mode, and there is no specific trigger logic of the page-pressing devices and the pressing heads action sequence required, the manual mode will no longer explained in embodiments 1-5.

In the following, in combination with FIGS. 1-16 and corresponding embodiments, the four page-pressing devices with the function of "releasing the mechanical locking when the pressing head is in pressure state, rising linearly, rotating forward, rotating reversely, falling linearly, pressing down and mechanically locking to maintain the pressing head in the pressure state" or the function of "releasing the mechanical locking when the pressing head is in pressure state, rotating upwards, rotating downwards, pressing down and mechanically locking to maintain the pressing head in pressure state" will be specified. The trigger logic for realizing page-pressing and barrier-free page-turning will be detailed described along with an action sequence of the pressing heads of the page-pressing devices.

Embodiment 1

Figure 2:
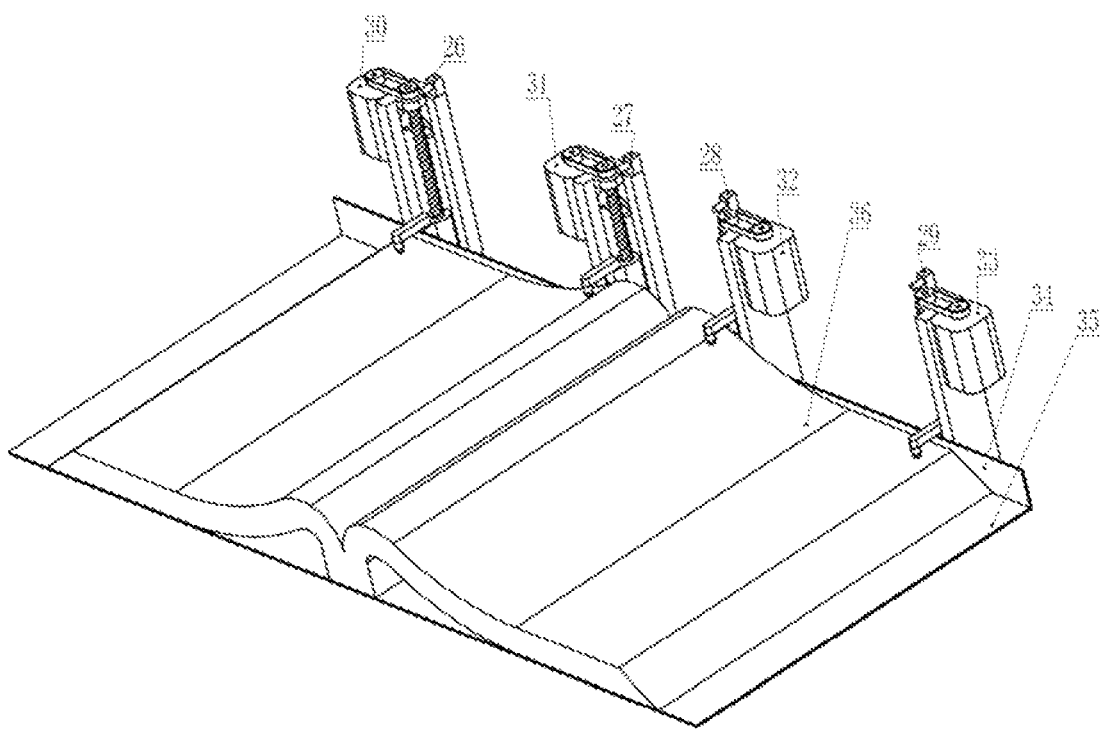
FIG. 2 is a schematic diagram of the apparatus for page-pressing and barrier-free page-turning according to one embodiment of the present disclosure. In which, all of the first page-pressing device, the second page-pressing device, the third page-pressing device and the fourth page-pressing device are in a first state which presses the book page.

As shown in FIG. 2, an apparatus for page-pressing and barrier-free page-turning is provided. The apparatus comprises four page-pressing devices with the function of "releasing the mechanical locking when the pressing head is in pressure state, rising linearly, rotating forward, rotating reversely, falling linearly, pressing down and mechanically locking to maintain the pressing head in the pressure state." The page-pressing devices as described in Embodiments 2-5 may be used in this embodiment. For example, the page-pressing device I as described in Embodiment 2 is adopted in this embodiment and will be detailed in the following context. In this embodiment, at least four page-pressing device I, including the first page-pressing device 30, the second page-pressing device 31, the third page-pressing device 32 and the fourth page-pressing device 33, are used.

Figure 16:
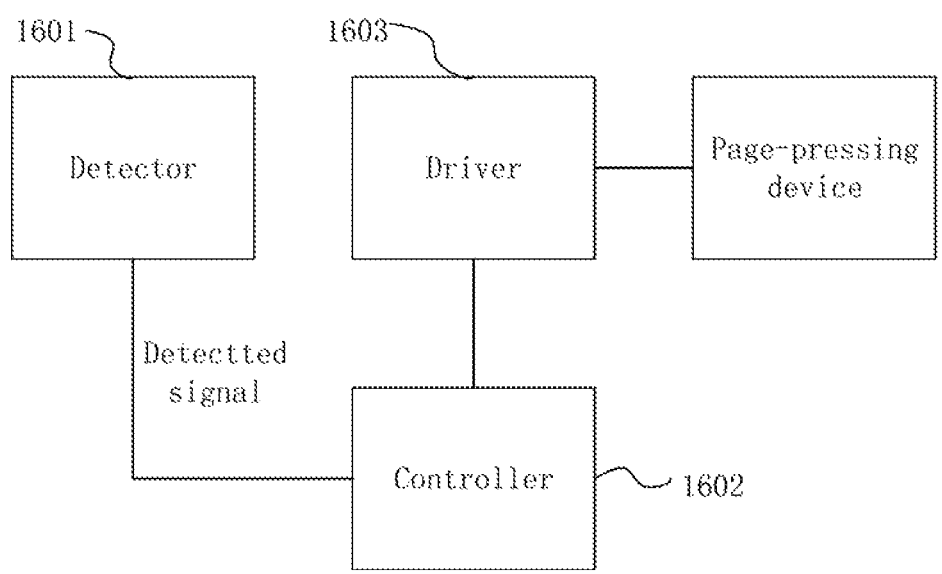
FIG. 16 is a schematic diagram of the control device (consisted of a detector, a driver and a controller).

More specifically, the first page-pressing device 30, the second page-pressing device 31, the third page-pressing device 32, and the fourth page-pressing device 33 are all secured on the base plate 34. The book 36 is placed on the base plate 34 and the back plate 35. The base plate 34 and the back plate 35 together forms the placement board for placing the book 36. The detector 1601 comprises a first sensor 26, a second sensor 27, a third sensor 28 and a fourth sensor 29. The first sensor 26, the second sensor 27, the third sensor 28 and the fourth sensor 29 are all installed at places that the page-turning hand could effectively trigger. As shown in FIG. 16, the driver 1603, the controller 1602 are respectively connected to the motors and the sensors of the four page-pressing devices. Under normal conditions, the four devices are maintained in the first state which the book 36 is pressed down.

As shown in FIG. 1, the first page-pressing device 30 is same as the second page-pressing device 31. The third page-pressing device 32 is same as the fourth page-pressing device 33. The rotation direction of the first page-pressing device 30 and the second page-pressing device 31 is reverse to it of the third page-pressing device 32 and the fourth page-pressing device 33. There are four pressing heads: the pressing head 21 of the first page-pressing device 30 is named the first pressing head; the pressing head 21 of the second page-pressing device 31 is named the second pressing head; the pressing head 21 of the third page-pressing device 32 is named the third pressing head; the pressing head 21 of the fourth page-pressing device 33 is named the fourth pressing head. One trigger logic and the pressing heads' action sequence of the apparatus for page-pressing and barrier-free page-turning will be described in detail as below.

As shown in FIG. 1, all the four pressing heads (i.e. the first pressing head, the second pressing head, the third pressing head and the fourth pressing head) of the apparatus are raised to the topmost, and in a state that they are rotated by 90° according to a preset rotation direction. In this state, it is convenient for placing the book 36 which has been settled to be opened/turned to a desired page.

As shown in FIG. 2, the book 36 is placed on the back plate 35, and the four pressing heads are all pressed against the pages of the book 36. The pages are pressed tightly against the back plate 35. At this state, the four devices are all prepared well to cooperate with the page-turning action of the page-turning hand.

Figure 3:
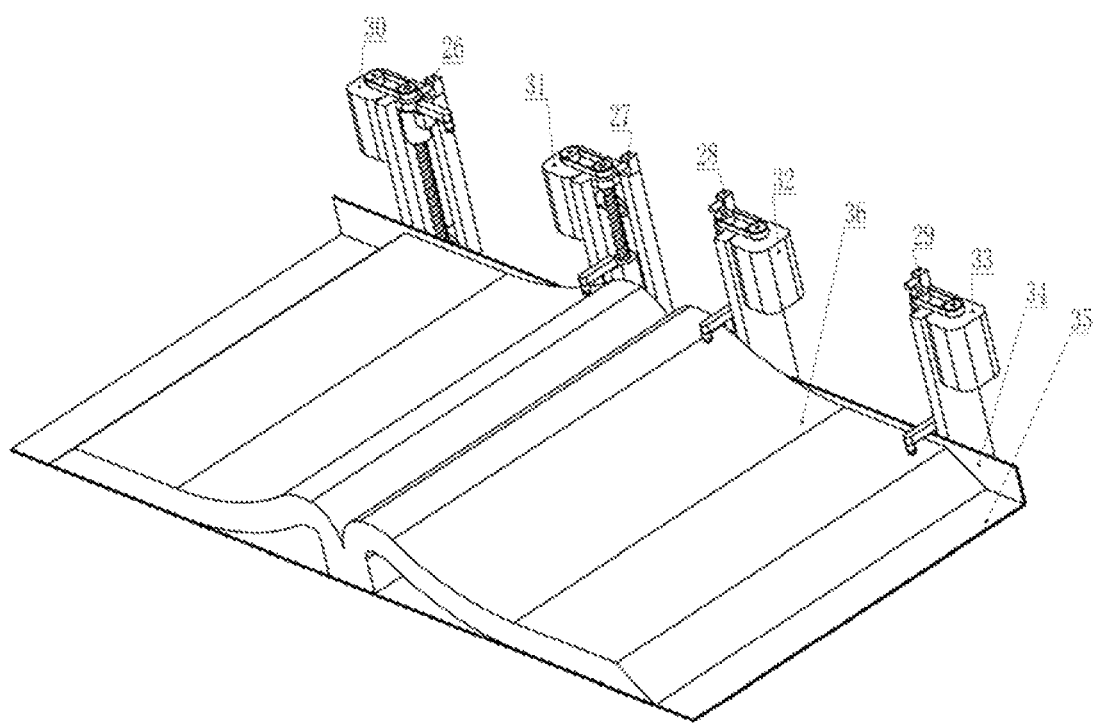
FIG. 3 is a schematic diagram of the apparatus for page-pressing and barrier-free page-turning according to one embodiment of the present disclosure. In which, the first page-pressing device is in the second state, while the second page-pressing device, the third page-pressing device and the fourth page-pressing device are in the first state.

As shown in FIG. 3, the user (not shown) is facing the book 36. When the hand of the user turns the page from right to left, the movement of the page-turning hand will trigger a first signal state of the first sensor 26, and then the first pressing head of the first page-pressing device 30 acts in response to the first signal state and is raised to the topmost and is rotated by 90°. By so, the first pressing head stop pressing the page so that the page-turning action continues.

Figure 4:
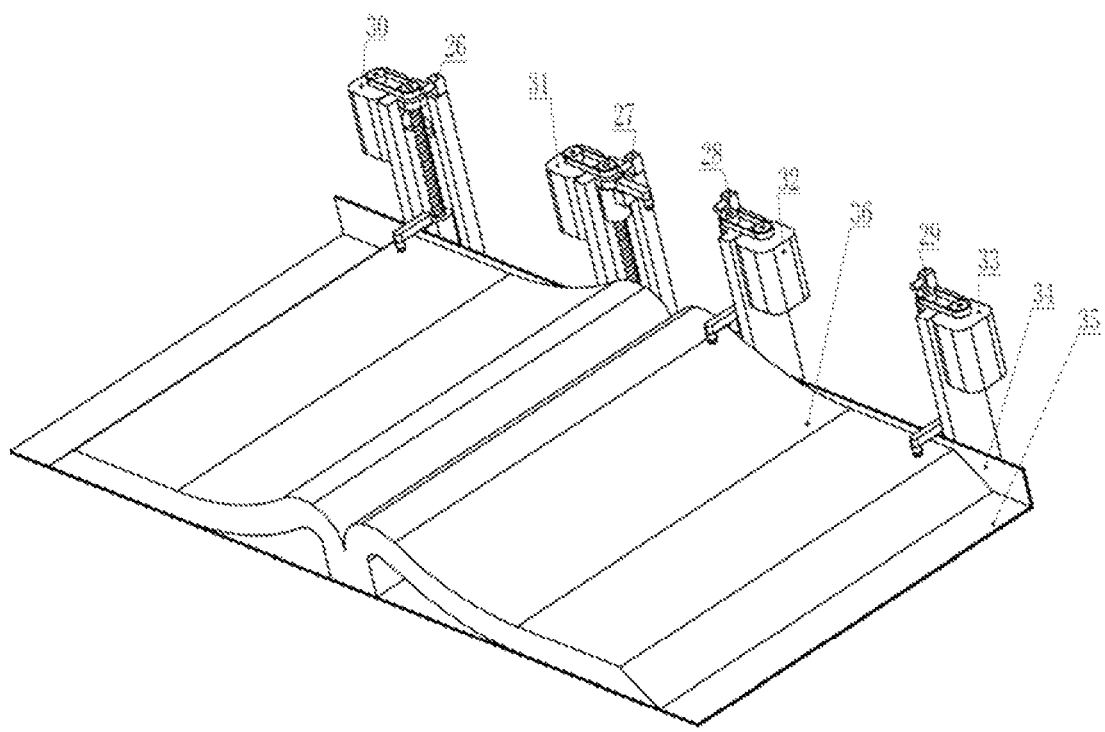
FIG. 4 is a schematic diagram of the apparatus for page-pressing and barrier-free page-turning according to one embodiment of the present disclosure. In which, the second page-pressing device is in the second state, while the first page-pressing device, the third page-pressing device and the fourth page-pressing device are in the first state.
Figure 5:
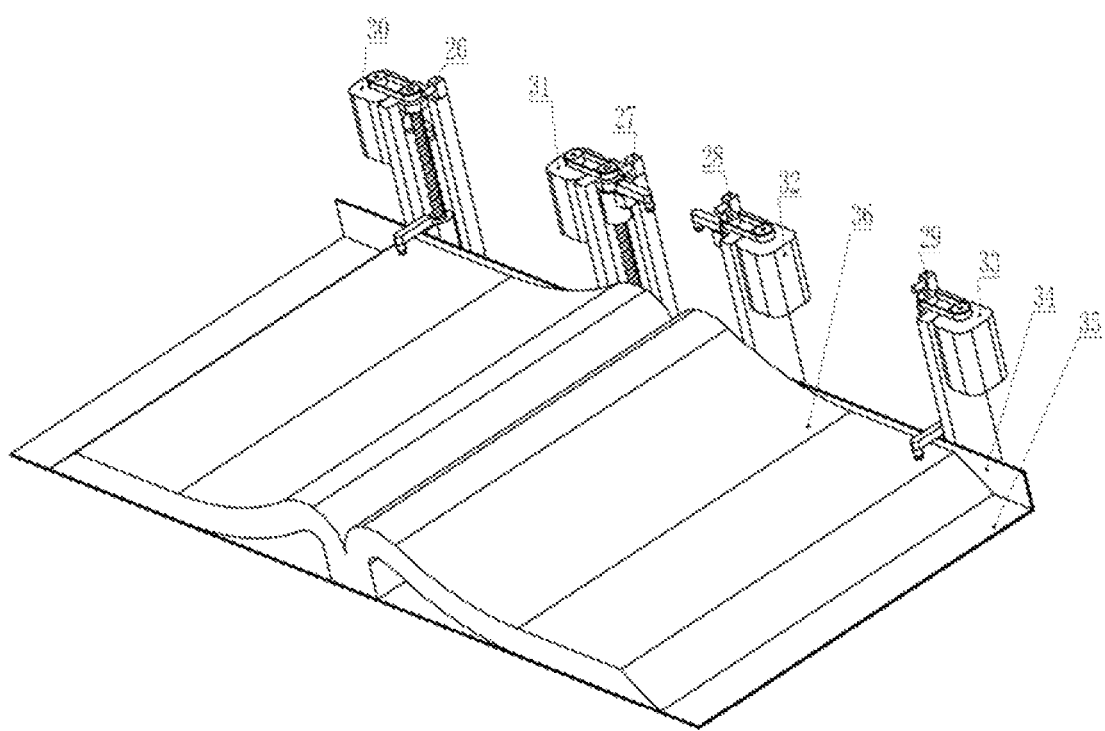
FIG. 5 is a schematic diagram of the apparatus for page-pressing and barrier-free page-turning according to one embodiment of the present disclosure. In which, the second page-pressing device and the third page-pressing device are in the second state, while the first page-pressing device and the fourth page-pressing device are in the first state.

In the continuing page-turning process after the page-turning hand passes the first page-pressing device 30, the page-turning hand then triggers a second signal state of the first sensor 26. The first pressing head of the first page-pressing device 30 acts in response to the second signal state and is reversely rotated by 90° and is descended to press against the book 36, as shown in FIG. 2. After action of the first pressing head is completed, the second pressing head of the second page-pressing device 31 acts and is raised to the topmost and is rotated by 90°, as shown in FIG. 4. After action of the second pressing head is completed, the third pressing head of the third page-pressing device 32 acts and is raised to the topmost and is rotated by 90°, as shown in FIG. 5. In FIG. 5, the second pressing head and the third pressing head stop pressing the pages so that the page-turning hand and the flipped page can pass the page-pressing devices without barrier.

Figure 6:
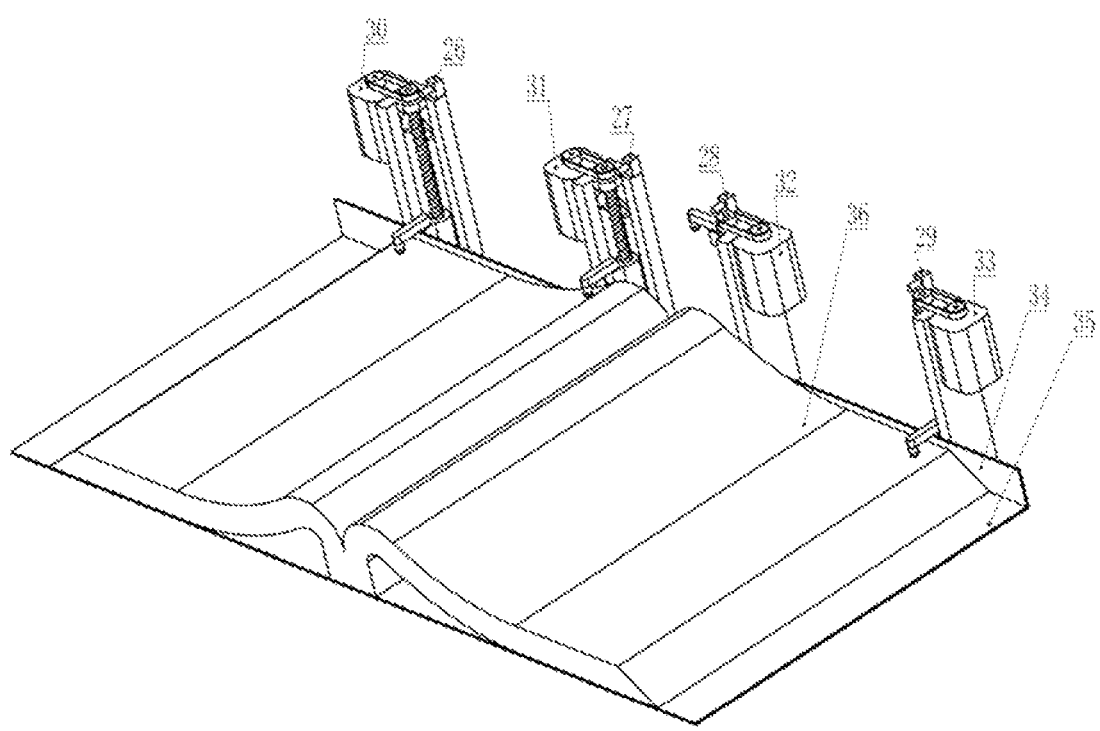
FIG. 6 is a schematic diagram of the apparatus for page-pressing and barrier-free page-turning according to one embodiment of the present disclosure. In which, the third page-pressing device is in the second state, while the first page-pressing device, the second page-pressing device and the fourth page-pressing device are in the first state.

In the following page-turning process, the movement of the page-turning hand then triggers a first signal state of the third sensor 28. The second pressing head of the second page-pressing device 31 acts in response to the first signal state and is reversely rotated by 90° and is descended to press against the book 36, as shown in FIG. 6. At this state, the page-turning hand is at a centerline position of the book 36.

Figure 7:
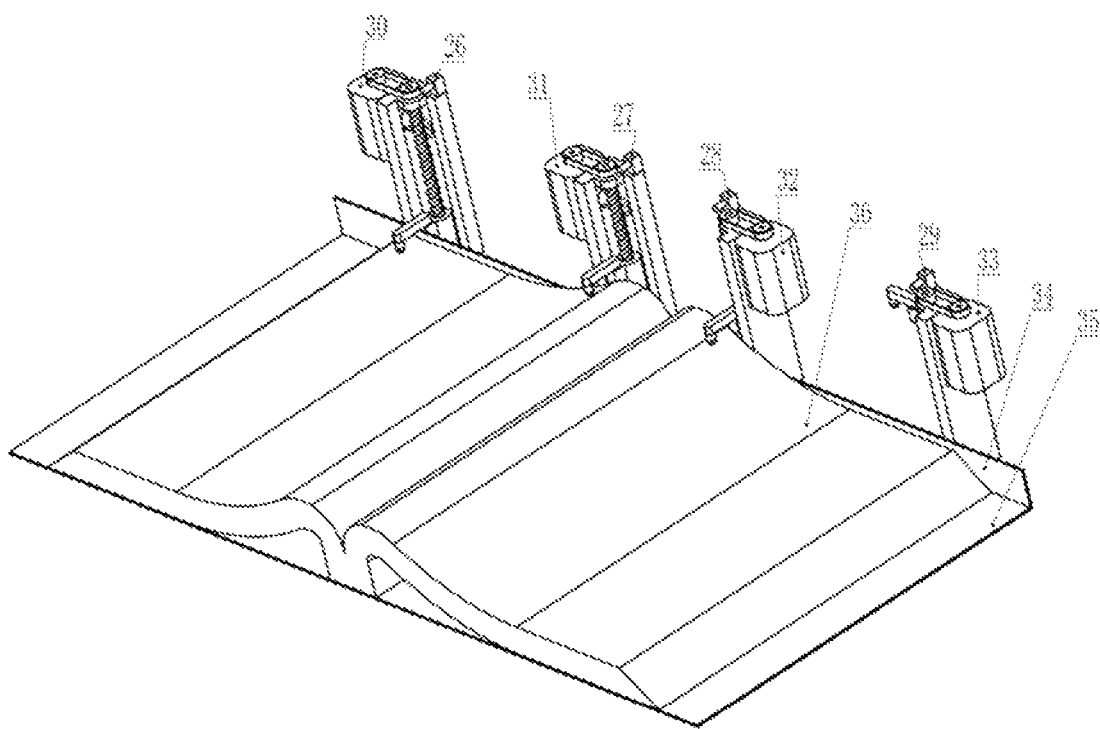
FIG. 7 is a schematic diagram of the apparatus for page-pressing and barrier-free page-turning according to one embodiment of the present disclosure. In which, the fourth page-pressing device is in the second state, while the first page-pressing device, the second page-pressing device, and the third page-pressing device are in the first state.

In the following page-turning process, the page-turning hand has been at the right of the fourth page-pressing device 33. In this state, the page-turning hand triggers a first signal state of the fourth sensor 29. The third pressing head of the third page-pressing device 32 acts in response to the first signal state of the fourth sensor 29 and is reversely rotated by 90° and is descended to pressed against the book 36, similar as the state shown in FIG. 2. After the action of the third pressing head is completed, the fourth pressing head of the fourth page-pressing device 33 acts and is raised to the topmost and is rotated by 90°. In this state, the fourth pressing head stops pressing the pages so that the page-turning action continues, as shown in FIG. 7.

In the following page-turning process, the page-turning hand has been arrived at the left of the fourth page-pressing device 33. In this state, the page-turning hand triggers a second signal state of the fourth sensor 29. The fourth pressing head of the fourth page-pressing device 33 acts in response to the second signal state of the fourth sensor 29 and is reversely rotated by 90° and is descended to press against the book 36, similar as the state shown in FIG. 2. At this point, a page-turning process is completed.

The first sensor 26, the third sensor 28 and the fourth sensor 29 are involved in the page-turning process from right to left.

When pages are turned from left to right, the action logic of the four page-pressing devices is similar to the page-turning from right to left, and the fourth sensor 29, the second sensor 27, and the first sensor 26 will be involved.

Each page-pressing device of the apparatus for page-pressing and barrier-free page-turning follows the action of the page-turning hand to make corresponding rising and rotating motions, so as to avoid the flipped pages of the book 36, so that the page-turning action is smooth and uninterrupted. In the meantime, each side of left and right of the book 36 pages is pressed against the back plate 35 by at least one pressing head 21 of the page-pressing devices at any time during the page-turning process. The book 36 can remain stable when its pages are both turned or not turned.

Embodiment 2

Figure 8:
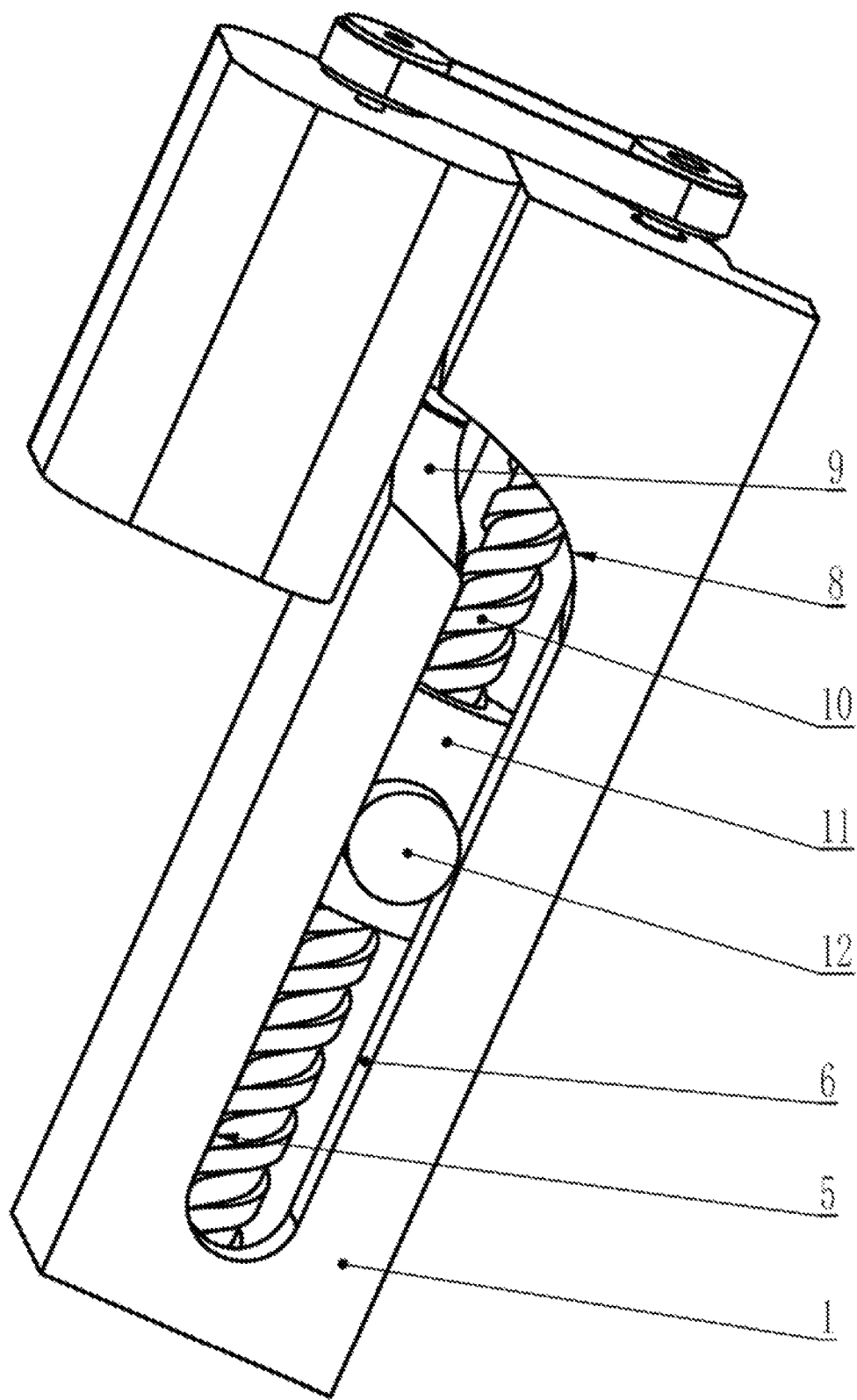
FIG. 8 is a schematic diagram of the page-pressing device I with the function of "releasing the mechanical locking when the pressing head is in pressure state, rising linearly, rotating forward, rotating reversely, falling linearly, pressing down and mechanically locking to maintain the pressing head in the pressure state."
Figure 9:
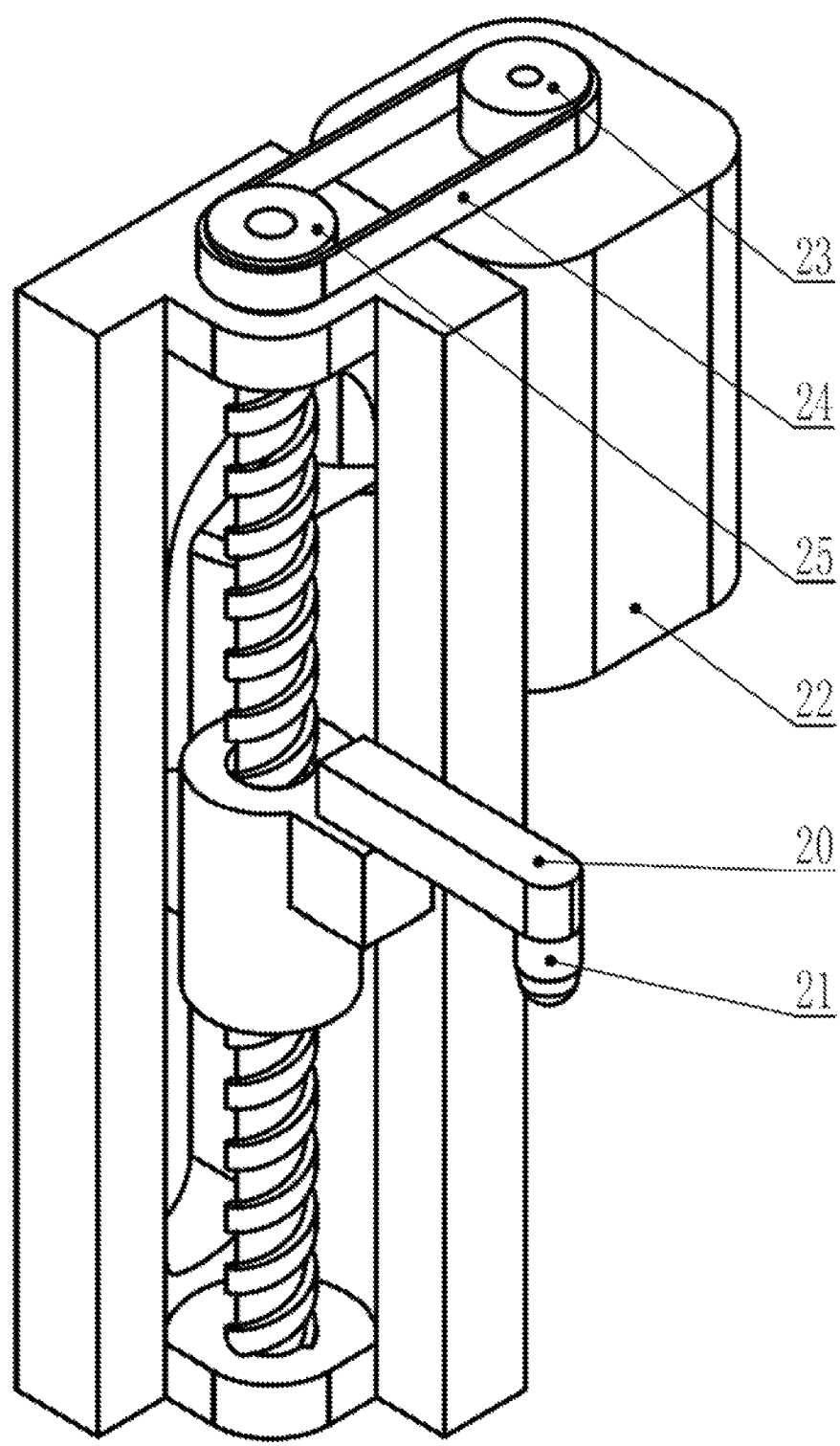
FIG. 9 is a schematic diagram of the page-pressing device I with the function of "releasing the mechanical locking when the pressing head is in pressure state, rising linearly, rotating forward, rotating reversely, falling linearly, pressing down and mechanically locking to maintain the pressing head in the pressure state."

As shown in FIG. 8 and FIG. 9, the page-pressing device I of the present disclosure with the function of "releasing the mechanical locking when the pressing head is in pressure state, rising linearly, rotating forward, rotating reversely, falling linearly, pressing down and mechanically locking to maintain the pressing head in the pressure state." The page-pressing device I is consisted of a base I 1, a screw 10, a nut 11, a nut guide table 12, a pressing head connecting rod 20, a pressing head 21, a motor 22, a driving wheel 23, a transmission mechanism 24 and a driven wheel 25. The motor 22 is secured on the base I 1. The driving wheel 23 is secured on the motor 22. The driven wheel 25 is secured on the screw 10. The driving wheel 23 is connected to the driven wheel 25 through the transmission mechanism 24. When the thread raising angle of the screw 10 and the nut 11 is less than or equal to the comprehensive self-locking angle, the pressing head 21 is self-locked in the screw 10 axial direction. The base I 1, the screw 10, the nut 11 and the nut guide table 12 form motion relationships by three kinematic pairs: the first one is a rotation pair between the base I 1 and the screw 10; the second one is a screw pair between the screw 10 and the nut 11; the third one is a friction pair between the base I 1 and the nut guide table 12. The screw 10 is installed on the base I 1 through the rotation pair. The screw 10 and the nut 11 are coordinatively installed through the screw pair. The nut guide table 12 contacts one side of the track slot I of the base I 1 through the friction pair. The pressing head connecting rod 20 is secured on the nut 11.

When a forward torque is applied to the screw 10 that is greater than the torque required to release the pressing head 21 which is in the screw 10 axial self-locking state, the screw 10 pushes the nut 11 up along straight guide surface I 5 of the track slot I. When it is raised to the topmost of the straight guide surface I 5, the nut guide table 12 contacts the rotary guide surface I 8. The rotation force around the screw 10 axis which the screw 10 applies to the nut 11 and the rotation force around the screw 10 axis which the rotary guide surface I 8 applies to the nut 11 are in the same direction, and they form the rotation force of the nut 11. The screw 10 axial force which the screw 10 applies to the nut 11 overcomes the screw 10 axial force which the rotary guide surface I 8 applies to the nut 11, and forms the axial force of the nut 11. Under the combined effect of the rotation force and the axial force, the nut 11 is rotated forward and is raised along the rotary guide surface I 8, until the nut guide table 12 reaches the upper end of rotary guide surface II 9.

When a reverse torque is applied to the screw 10, its principle of motion is the same as that of applying forward torque. The screw 10 pushes the nut 11 to rotate reversely and descend along the rotary guide surface II 9. When the nut 11 is departed from the rotary guide surface II 9 and contacts the straight guide surface II 6, it is descended along the straight guide surface II 6 until the pressing head 21 contacts the book 36 and applies pressure to the book 36. Because the thread raising angle of the screw 10 and the nut 11 is less than or equal to the comprehensive self-locking angle, when the torque applied to the screw 10 is stopped, the pressure of the pressing head 21 to the book 36 is maintained.

Embodiment 3

Figure 10:
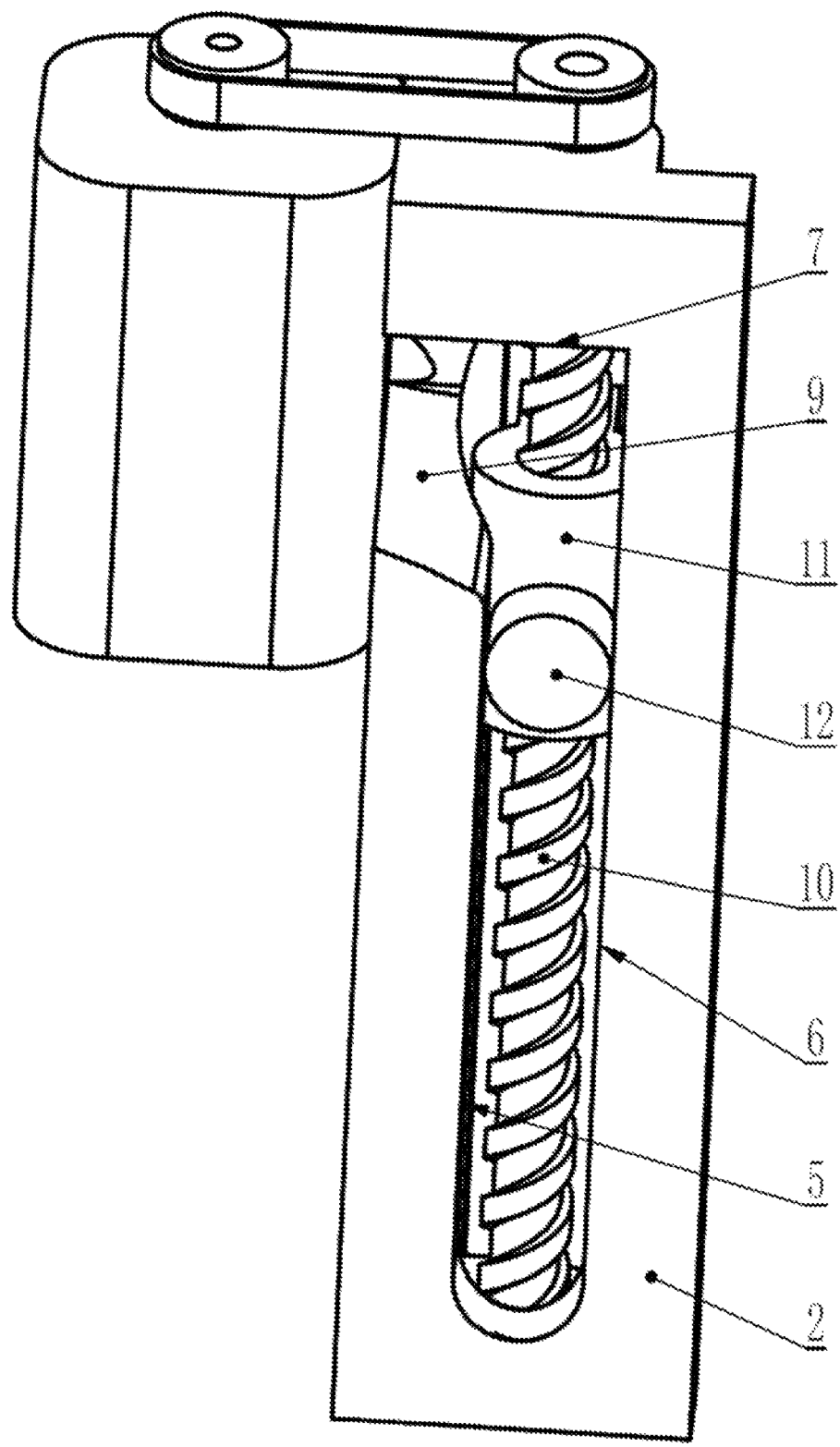
FIG. 10 is a schematic diagram of the page-pressing device II with the function of "releasing the mechanical locking when the pressing head is in pressure state, rising linearly, rotating forward, rotating reversely, falling linearly, pressing down and mechanically locking to maintain the pressing head in the pressure state."
Figure 11:
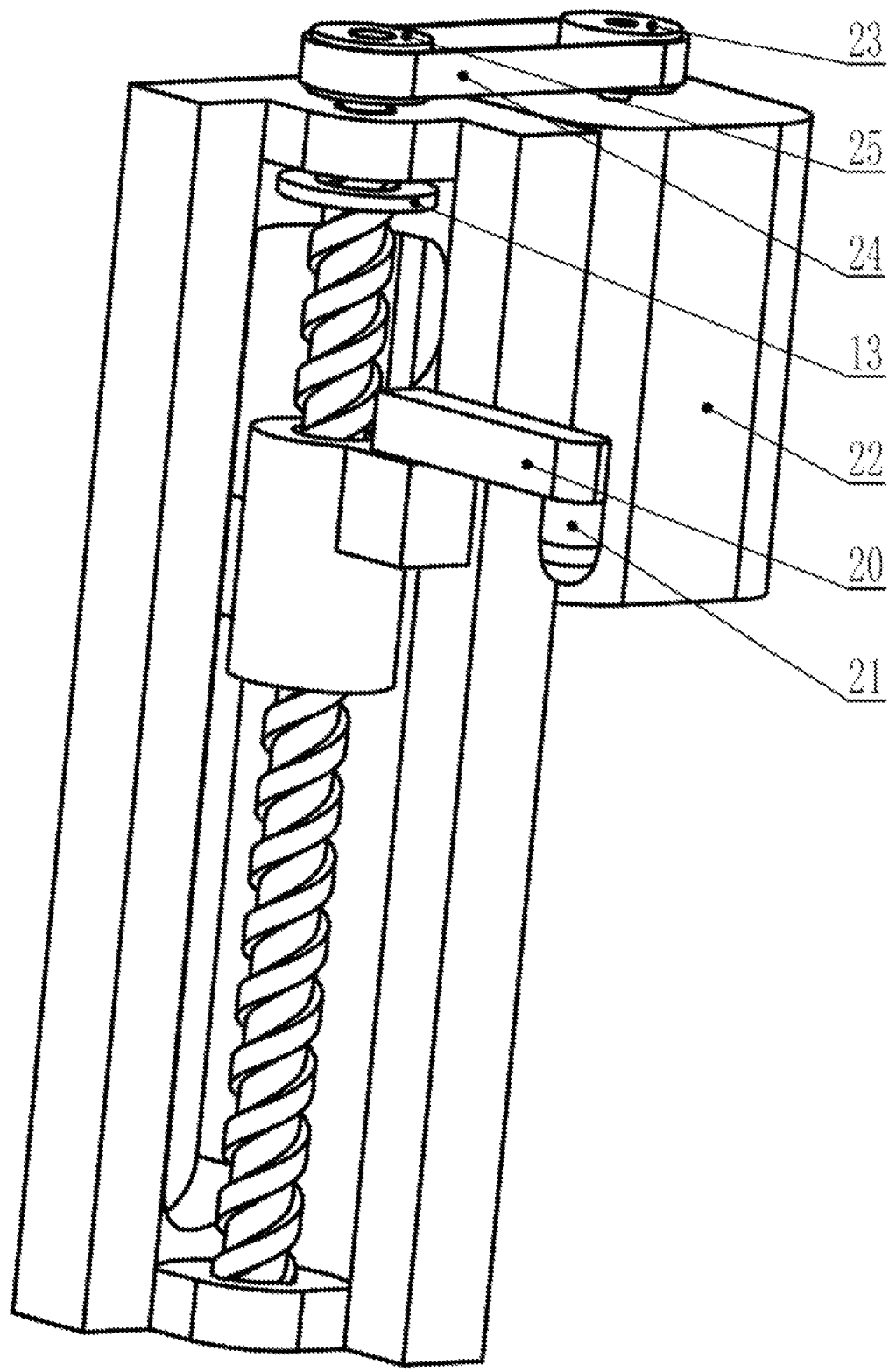
FIG. 11 is a schematic diagram of the page-pressing device II with the function of "releasing the mechanical locking when the pressing head is in pressure state, rising linearly, rotating forward, rotating reversely, falling linearly, pressing down and mechanically locking to maintain the pressing head in the pressure state."

As shown in FIG. 10 and FIG. 11, the page-pressing device II of the present disclosure with the function of "releasing the mechanical locking when the pressing head is in pressure state, rising linearly, rotating forward, rotating reversely, falling linearly, pressing down and mechanically locking to maintain the pressing head in the pressure state." The page-pressing device II is consisted of a base II 2, a screw 10, a nut 11, a nut guide table 12, a nut stop ring 13, a pressing head connecting rod 20, a pressing head 21, a motor 22, a driving wheel 23, a transmission mechanism 24 and a driven wheel 25. The motor 22 is secured on the base II 2. The driving wheel 23 is secured on the motor 22. The driven wheel 25 is secured on the screw 10. The driving wheel 23 is connected to the driven wheel 25 through the transmission mechanism 24. When the thread raising angle of the screw 10 and the nut 11 is less than or equal to the comprehensive self-locking angle, the pressing head 21 is self-locked in the screw 10 axial direction. The base II 2, the screw 10, the nut 11 and the nut guide table 12 form motion relationships by three kinematic pairs: the first one is a rotation pair between the base II 2 and the screw 10; the second one is a screw pair between the screw 10 and the nut 11; the third one is a friction pair between the base II 2 and the nut guide table 12. The screw 10 is installed on the base II 2 through the rotation pair. The screw 10 and the nut 11 are coordinatively installed through the screw pair. The nut guide table 12 contacts one side of the track slot II of the base II 2 through the friction pair. The nut stop ring 13 is secured on the screw 10. The pressing head connecting rod 20 is secured on the nut 11.

When a forward torque is applied to the screw 10, and the forward torque is greater than the torque required to release the pressing head 21 which is in the axial self-locking state about the screw 10. The screw 10 pushes the nut 11 up along the straight guide surface I 5 of the track slot II. When the nut 11 is raised to the topmost of the straight guide surface I 5, the restriction is released, and the nut 11 is rotated forward and is raised at the same time. Since the length of the rotary guide surface II 9 about the axial direction of the screw 10 is determined according to the parameters such as the thread raising angle of the screw 10 and the nut 11, the total mass and comprehensive rotational inertia of the nut 11 and related components secured to the nut 11, etc, in order to increase the rotation speed of the nut 11 by the rotary guide surface II 9 during the reverse rotation descent of the nut 11, in the condition that the nut 11 is rotated forward and there is no rotary guide surface to increase the rotation speed of the nut 11, the nut 11 must first contact the nut stop ring 13 and combine with the screw 10 before the nut guide table 12 reaches the rotary guide surface II 9. Under the torque transmitted to the screw 10 and the equivalent comprehensive rotational kinetic energy on the screw 10, the nut 11 and the screw 10 are rotated together until the nut guide table 12 reaches the upper end of the rotary guide surface II 9, and then the nut 11 and the screw 10 stop together.

When a reverse torque is applied to the screw 10, the rotation force around the axis of the screw 10 which the screw 10 applies to the nut 11 and the rotation force around the axis of the screw 10 which the rotary guide surface II 9 applies to the nut 11 are in the same direction, and they form the rotation force of the nut 11. The axial force of the screw 10 which the screw 10 applies to the nut 11 overcomes the axial force of the screw 10 which the rotary guide surface II 9 applies to the nut 11, and forms the axial force of the nut 11. Under the combined effect of the rotation force and the axial force, the nut 11 is rotated reversely and is descended along the rotary guide surface II 9. When the nut guide table 12 departs rotary guide surface II 9 and contacts the straight guide surface II 6, the nut 11 is descended along the straight guide surface II 6 until the pressing head 21 contacts the book 36 and applies pressure to the book 36. Because the thread raising angle of the screw 10 and the nut 11 is less than or equal to the comprehensive self-locking angle, when the torque applied to the screw 10 is stopped, the pressure of the pressing head 21 to the book 36 is maintained.

Embodiment 4

Figure 12:
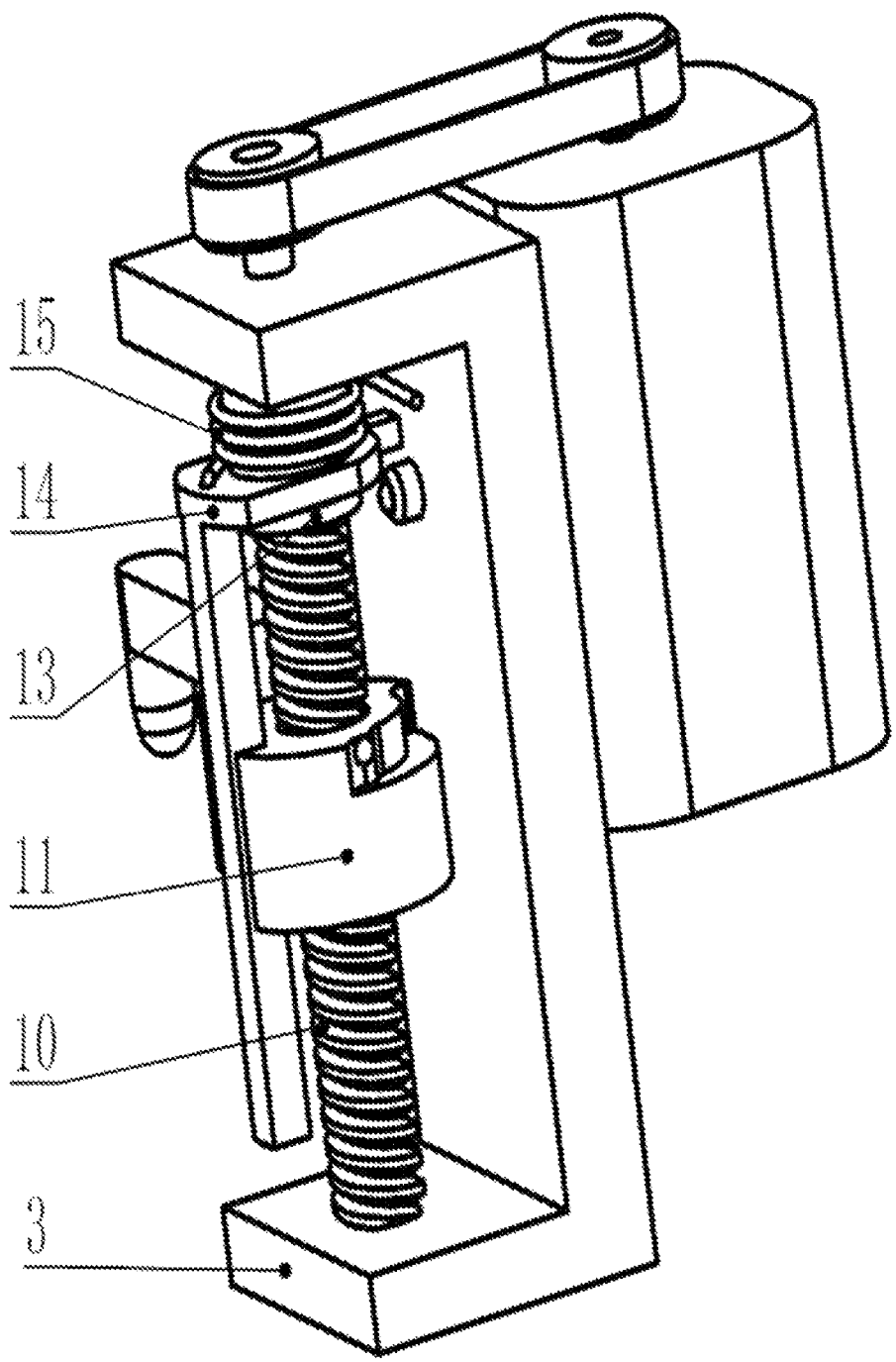
FIG. 12 is a schematic diagram of the page-pressing device III with the function of "releasing the mechanical locking when the pressing head is in pressure state, rising linearly, rotating forward, rotating reversely, falling linearly, pressing down and mechanically locking to maintain the pressing head in the pressure state."
Figure 13:
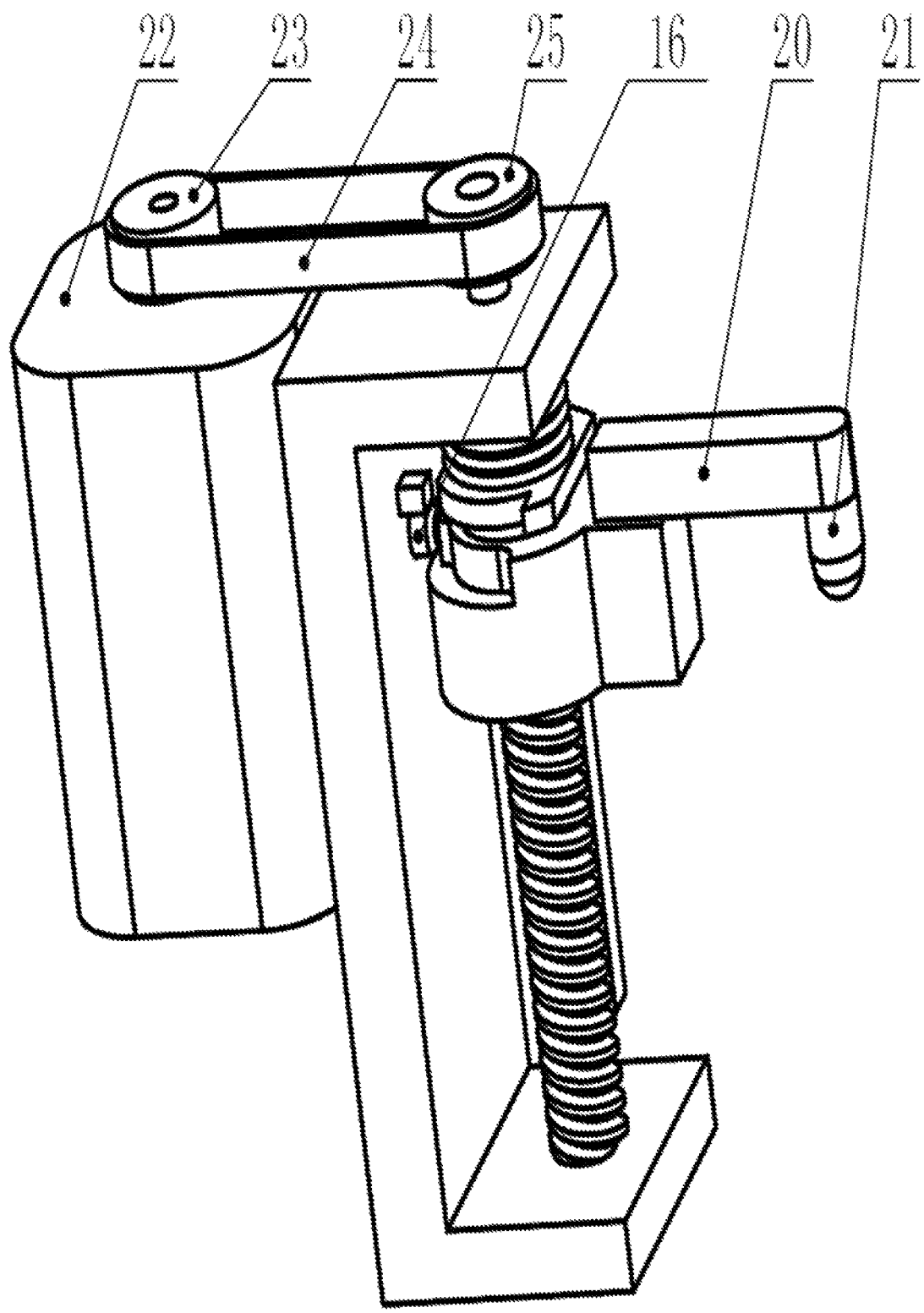
FIG. 13 is a schematic diagram of the page-pressing device III with the function of "releasing the mechanical locking when the pressing head is in pressure state, rising linearly, rotating forward, rotating reversely, falling linearly, pressing down and mechanically locking to maintain the pressing head in the pressure state."

As shown in FIG. 12 and FIG. 13, the page-pressing device III of the present disclosure with the function of "releasing the mechanical locking when the pressing head is in pressure state, rising linearly, rotating forward, rotating reversely, falling linearly, pressing down and mechanically locking to maintain the pressing head in the pressure state."

The page-pressing device III is consisted of a base III 3, a screw 10, a nut 11, a nut stop ring 13, a nut stewing frame 14, a torsion spring 15, a spring plunger 16, a pressing head connecting rod 20, a pressing head 21, a motor 22, a driving wheel 23, a transmission mechanism 24 and a driven wheel 25. The motor 22 is secured on the base III 3. The driving wheel 23 is secured on the motor 22. The driven wheel 25 is secured on the screw 10. The driving wheel 23 is connected to the driven wheel 25 through the transmission mechanism 24. When the thread raising angle of the screw 10 and the nut 11 is less than or equal to the comprehensive self-locking angle, the pressing head 21 is self-locked in the screw 10 axial direction. The base III 3, the screw 10, the nut 11, the nut slewing frame 14 form motion relationships by four kinematic pairs: the first one is a rotation pair between the base III 3 and the screw 10; the second one is a screw pair between the screw 10 and the nut 11; the third one is a sliding pair between the nut 11 and the nut slewing frame 14; the fourth one is a rotation pair between the screw 10 and the nut slewing frame 14. The screw 10 is installed on the base III 3 through the rotation pair. The screw 10 and the nut 11 are coordinatively installed through the screw pair. The nut stop ring 13 is secured on the screw 10. The nut slewing frame 14 is installed on the screw 10 through the rotation pair. The nut slewing frame 14 is also connected to the nut 11 through the sliding pair. The torsion spring 15 is installed coaxially and coordinatively with the screw 10 with one end secured on the base III 3 and another end secured to the nut stewing frame 14, so that the nut stewing frame 14 and the nut 11 are in balanced position under normal conditions. The spring plunger 16 is secured on the base III 3. The pressing head connecting rod 20 is secured on the nut 11.

When a torque is applied to the screw 10 which is reverse to the torque of the torsion spring 15 and is greater than the torque required to release the pressing head 21 which is in the axial self-locking state about the screw 10, the nut 11 is raised along the nut stewing frame 14 which is in balanced position. When the nut 11 contacts the nut stop ring 13, the nut 11 and the screw 10 are combined. The driving torque applied to the screw 10 overcomes the torque of the torsion spring 15 to rotate forward the nut 11 in place. At this time, the rotation of the nut 11 is restricted by the spring plunger 16, so that when the driving torque applied to the screw 10 is stopped and a reverse torque from the torsion spring 15 is applied to the nut 11, the nut 11 maintains its position.

When a reverse torque is applied to the screw 10, since the rotation of the nut 11 is restricted by the spring plunger 16, the nut 11 is descended a small distance along the axial direction of the screw 10, and the nut 11 is released from the rotation restriction of the spring plunger 16. Under the collective effect of torques of the screw 10 and the torsion spring 15 which are in the same direction, the nut stewing frame 14 and the nut 11 are reversely rotated to balanced position. The nut 11 is descended along the nut stewing frame 14 until the pressing head 21 contacts the book 36 and applies pressure to the book 36. Because the thread raising angle of the screw 10 and the nut 11 is less than or equal to the comprehensive self-locking angle, when the torque applied to the screw 10 is stopped, the pressure of the pressing head 21 to the book 36 is maintained.

Embodiment 5

Figure 14:
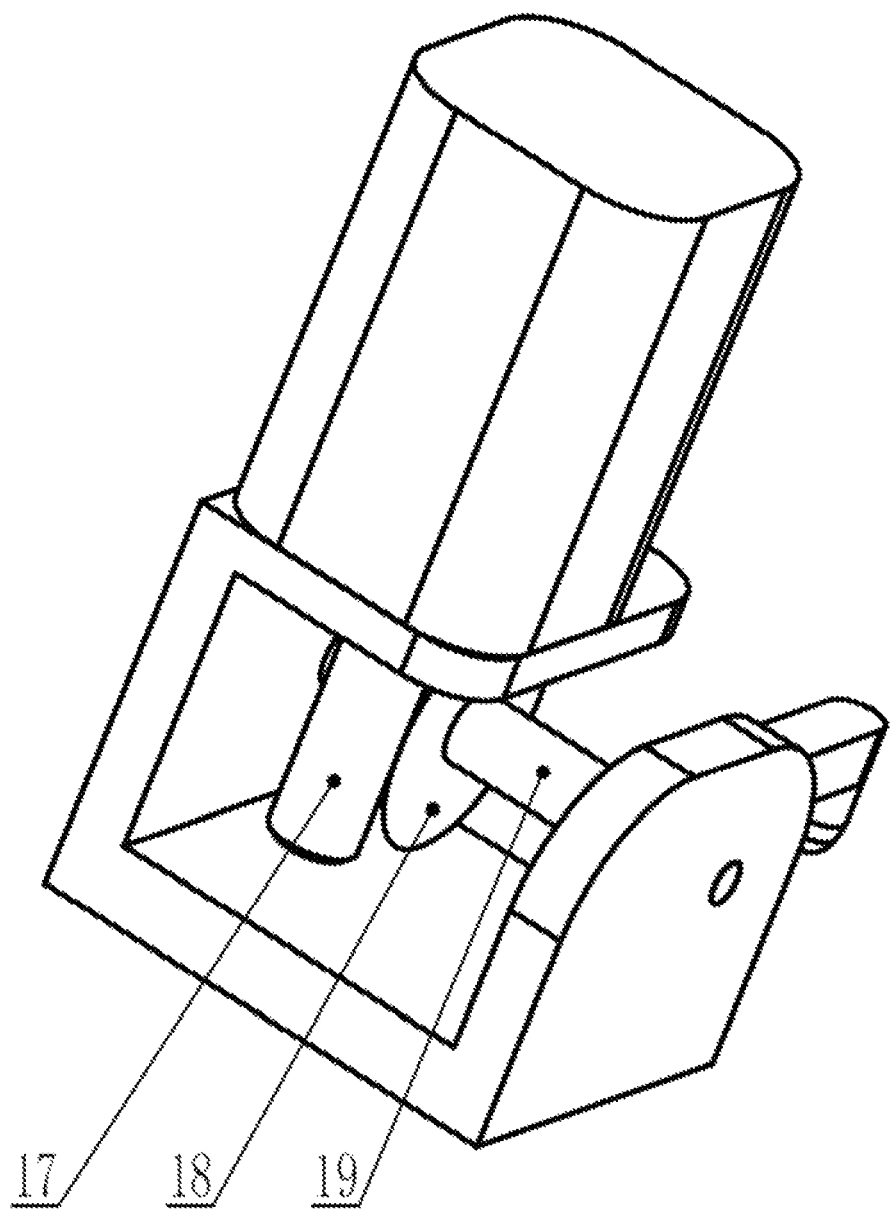
FIG. 14 is a schematic diagram of the page-pressing device IV with the function of "releasing the mechanical locking when the pressing head is in pressure state, rotating upwards, rotating downwards, pressing down and mechanically locking to maintain the pressing head in pressure state."
Figure 15:
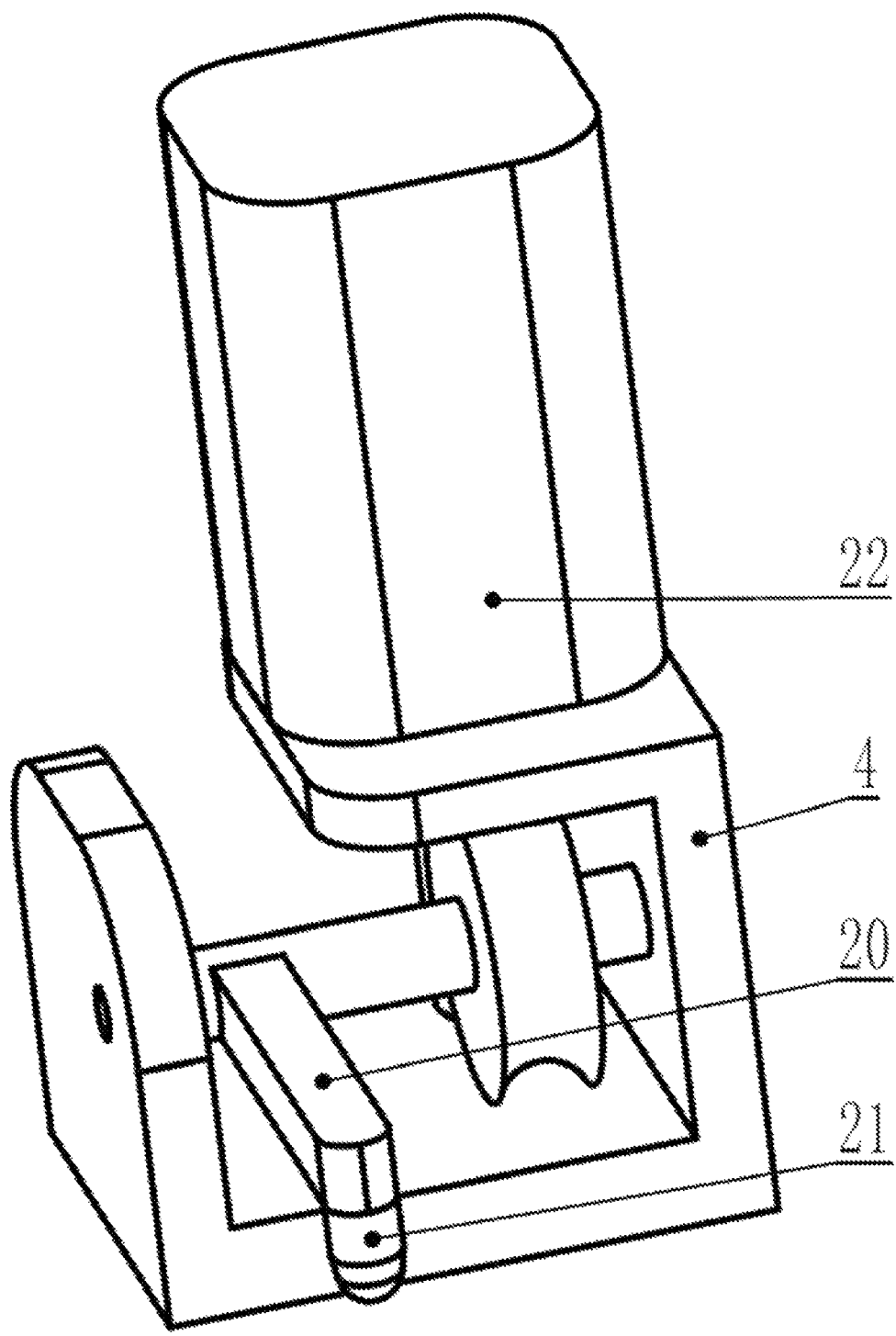
FIG. 15 is a schematic diagram of the page-pressing device IV with the function of "releasing the mechanical locking when the pressing head is in pressure state, rotating upwards, rotating downwards, pressing down and mechanically locking to maintain the pressing head in pressure state."

As shown in FIG. 14 and FIG. 15, the page-pressing device IV of the present disclosure with the function of "releasing the mechanical locking when the pressing head is in pressure state, rotating upwards, rotating downwards, pressing down and mechanically locking to maintain the pressing head in pressure state." The page-pressing device IV is consisted of a base IV 4, a worm 17, a worm gear 18, a worm gear shaft 19, a pressing head connecting rod 20, a pressing head 21, and a motor 22. The motor 22 is secured on the base IV 4. The worm 17 is driven by the motor 22. The thread raising angle of the worm 17 and the worm gear 18 is less than or equal to the equivalent friction angle. The base IV 4, the worm 17, the worm gear 18, and the worm gear shaft 19 form motion relationships by two kinematic pairs: the first one is a rotation pair between the base IV 4 and the worm gear shaft 19; the second one is a worm gear pair between the worm 17 and the worm gear 18. The worm gear shaft 19 is installed on the base IV 4 through the rotation pair. The worm 17 and the worm gear 18 are installed coordinatively through the worm gear pair. The worm gear 18 and the pressing head connecting rod 20 are all secured to the worm gear shaft 19.

When a forward torque is applied to the worm 17 that is greater than the torque required to release the worm 17 and the worm gear 18 which are in the self-locking state, the worm 17 drives the worm gear 18 to rotate forward, bringing the pressing head connecting rod 20 and the pressing head 21 to rotate upward. When a reverse torque is applied to the worm 17, the worm 17 drives the worm gear 18 to rotate reversely, bringing the pressing head connecting rod 20 and the pressing head 21 to rotate down until the pressing head 21 contacts the book 36 and applies pressure to the book 36. Because the thread raising angle of the worm 17 and the worm gear 18 is less than or equal to the equivalent friction angle, when the torque applied to the worm 17 is stopped, the pressure of the pressing head 21 to the book 36 is maintained.

INDUSTRIAL APPLICABILITY

The page-pressing devices with the function of "releasing the mechanical locking when the pressing head is in pressure state, rising linearly, rotating forward, rotating reversely, falling linearly, pressing down and mechanically locking to maintain the pressing head in the pressure state" or the page-pressing devices with the function of "releasing the mechanical locking when the pressing head is in pressure state, rotating upwards, rotating downwards, pressing down and mechanically locking to maintain the pressing head in pressure state" may be realized and powered by one motor. The apparatus for page-pressing and barrier-free page-turning have at least the following advantages: (1) compact structure and less parts, easy for manufacturing and test, and simple for modularization; (2) only one motor is needed for one device; less objects are driven or controlled; low requirements for drivers and controllers; (3) less matching devices are needed to realize the mechanical functions; high mechanical efficiency and fast time response; (4) applicable at both low speed and high speed operation; larger pitch screws with high transmission efficiency is available; impact load can be withstander; good rigidity and high stability are available; (5) indoor and outdoor environments of high and low temperature, high electromagnetism, etc, can be adapted; lubrication measure is not needed; (6) high reliability; low manufacturing cost and operating cost; (7) the apparatus for page-pressing and barrier-free page-turning allows people to completely free their hands when reading the paper books, except for one page-turning action with one hand during the page-turning process.

What is claimed is:

1. An apparatus for page-pressing and barrier-free page-turning, wherein the apparatus comprises a page-pressing device and a placement board;
   the page-pressing device is capable of switching between a first state and a second state;
   when the page-pressing device is in the first state, the page-pressing device is capable of tightly pressing against a book page(s) on the placement board;
   when the page-pressing device is in the second state, the page-pressing is capable of releasing the press onto the book page(s);
   the page-pressing device is capable of mechanically locking the book page(s) when the page-pressing device is in the first state to press against the book page(s);
   the page-pressing device is capable of maintaining a contact pressure to the book page(s) when the page-pressing device is mechanically locking onto the book page(s), but a power causing the contact pressure no longer exists;
   wherein the apparatus further comprises a control device consisted of a detector, a driver and a controller; the control device is capable of recognizing user's body signal through the detector, and controlling the switch of the page-pressing device between the first state and the second state.

2. The apparatus according to claim 1, wherein when the page-pressing device switches between the first state and the second state, the page-pressing device is raised or descended linearly and is rotated clockwise or anticlockwise so as to avoid flipped page(s) or press against the book page(s); or, when the page-pressing device switches between the first and the second state, the page-pressing device is rotated upwards or downwards to avoid flipped page(s) or press against the book page(s).

3. The apparatus according to claim 2, wherein the page-pressing device comprises a base I connected to the placement board, a pressing head connecting rod movably mounted on the base I, and a pressing head connected to the base I through the pressing head connecting rod;
   the pressing head connecting rod is capable of switching between the first state and the second state; when the page-pressing device is in the first state, the pressing head of the page-pressing device is capable of contacting the book page(s); when the page-pressing device is in the second state, the pressing head of the page-pressing device is capable of releasing the contact with the book page(s);
   the pressing head connecting rod is movably connected to the base I through a power transmission mechanism;
   the power transmission mechanism comprises a screw, a nut; the pressing head connecting rod is connected to the screw through the nut.

4. The apparatus according to claim 3, wherein the base I is provided with guide surfaces that allow the pressing head connecting rod to switch between the first state and the second state;
   the apparatus further comprises a nut guide table and the nut guide table is attached to the nut;
   the guide surfaces comprise a straight guide surface I, a straight guide surface II, a rotary guide surface I, and a rotary guide surface II;
   the straight guide surface I is parallel to an axis of the screw, or the straight guide surface I is extended to contain the axis of the screw;
   the straight guide surface II is parallel to the axis of the screw, or the straight guide surface II is extended to contain the axis of the screw; and the screw guide table contacts the guide surface through a friction pair, and is capable of moving along the guide surfaces driven by the power transmission mechanism.

5. The apparatus according to claim 3, wherein the thread raising angle of the screw and the nut is less than or equal to a comprehensive self-lock angle, so that the pressing head is capable of being axially self-lock about the screw.

6. The apparatus according to claim 3, wherein the power transmission mechanism further comprises a motor, a transmission mechanism, a driving wheel, a driven wheel; the driving wheel is secured on the motor, and the driven wheel is secured on the screw; the driving wheel and the driven wheel are connected through the transmission mechanism; the screw is rotated by the motor through the driving wheel, the transmission mechanism, and the driven wheel.

7. The apparatus according to claim 1, wherein the page-pressing device comprises a base II which is connected to the placement board; a pressing head connecting rod movably mounted on the base II; and a pressing head connected to the base II through the pressing head connecting rod;
the pressing head connecting rod is capable of switching between the first state and the second state; when the page-pressing device is in the first state, the pressing head of the page-pressing device is capable of contacting the book page(s); when the page-pressing device is in the second state, the pressing head of the page-pressing device is capable of releasing the contact with the book page(s);
the pressing head connecting rod is movably connected to the base II through a power transmission mechanism;
the power transmission mechanism comprises a screw, a nut stop ring, and a nut;
the apparatus further comprises a nut guide table provided on the nut;
the base II is provided with guide surfaces; the guide surfaces comprise a straight guide surface I, a straight guide surface II, and a rotary guide surface II;
the straight guide surface I is parallel to an axis of the screw, or the straight guide surface I is extended to contain the axis of the screw;
the straight guide surface II is parallel to the axis of the screw, or the straight guide surface II is extended to contain the axis of the screw;
the nut stop ring is secured on the screw; the pressing head connecting rod is secured on the nut.

8. The apparatus according to claim 7, wherein the thread raising angle of the screw and the nut is less than or equal to a comprehensive self-lock angle, so that the pressing head is capable of being axially self-locked about the screw.

9. The apparatus according to claim 7, wherein the power transmission mechanism further comprises a motor, a transmission mechanism, a driving wheel, a driven wheel; the driving wheel is secured on the motor, and the driven wheel is secured on the screw; the driving wheel and the driven wheel are connected through the transmission mechanism; the screw is rotated by the motor through the driving wheel, the transmission mechanism, and the driven wheel.

10. The apparatus according to claim 1, wherein the page-pressing apparatus comprises a base III connected to the placement board; a pressing head connecting rod movably mounted on the base III; and a pressing head connecting to the base III through the pressing head connecting rod;
the pressing head connecting rod is capable of switching between the first state and the second state; when the page-pressing device is in the first state, the pressing head of the page-pressing device is capable of contacting the book page(s); when the page-pressing device is in the second state, the pressing head of the page-pressing device is capable of releasing the contact with the book page(s);
the pressing head connecting rod is movably connected to the base III through a power transmission mechanism;
the power transmission mechanism comprises a screw, a nut stop ring, a nut slewing frame, a nut, a torsion spring, a spring plunger;
the nut stop ring is secured on the screw; the nut slewing frame is rotatably mounted on the screw; the nut slewing frame is connected to the nut through a sliding pair; the torsion spring is coaxially mounted with the screw, with one end being secured to the base III and the other end being secured to the screw slewing frame; the spring plunger is secured on the base III; the pressing head connecting rod is secured on the nut.

11. The apparatus according to claim 10, wherein the thread raising angle of the screw and the nut is less than or equal to a comprehensive self-lock angle, so that the pressing head is capable of being axially self-locked about the screw.

12. The apparatus according to claim 10, wherein the power transmission mechanism further comprises a motor, a transmission mechanism, a driving wheel, a driven wheel; the driving wheel is secured on the motor, and the driven wheel is secured on the screw; the driving wheel and the driven wheel are connected through the transmission mechanism; the screw is rotated by the motor through the driving wheel, the transmission mechanism, and the driven wheel.

13. The apparatus according to claim 1, wherein the page-pressing device comprises a base IV, a worm, a worm gear, a worm gear shaft, a pressing head, and a pressing head connecting rod; the worm is mounted with the worm gear through a worm gear pair; both the worm gear and the pressing head connecting rod are secured on the worm gear shaft; the pressing head is connected to the worm gear shaft through the pressing head connecting rod.

14. The apparatus according to claim 13, wherein the page-pressing device further comprises a motor; the motor is secured on the base IV for driving the worm.

15. The apparatus according to claim 13, wherein the thread raising angle of the worm gear and the worm is less than or equal to an equivalent friction angle, so that the pressing head is capable of being self-locked about the worm.

16. The apparatus according to claim 1, wherein the detector comprises sensors and an image recognizer.

17. The apparatus according to claim 1, wherein the placement board comprises a base plate and a back plate.

* * * * *